US007366702B2

(12) United States Patent
David

(10) Patent No.: US 7,366,702 B2
(45) Date of Patent: Apr. 29, 2008

(54) SYSTEM AND METHOD FOR SECURE NETWORK PURCHASING

(75) Inventor: Sancho Enrique David, Atzmaut (IL)

(73) Assignee: iPass Inc., Redwood Shores, CA (US)

( * ) Notice: Subject to any disclaimer, the term of this patent is extended or adjusted under 35 U.S.C. 154(b) by 675 days.

(21) Appl. No.: 09/875,795

(22) Filed: Jun. 6, 2001

(65) Prior Publication Data

US 2002/0073046 A1 Jun. 13, 2002

(30) Foreign Application Priority Data

Jul. 31, 2000 (WO) .................... PCT/US00/21058

(51) Int. Cl.
*G06F 17/60* (2006.01)
(52) U.S. Cl. ...................... 705/67; 705/1; 382/115; 382/139; 235/380
(58) Field of Classification Search .............. 705/67, 705/1; 382/115, 139; 235/380
See application file for complete search history.

(56) References Cited

U.S. PATENT DOCUMENTS

| 4,885,777 A | 12/1989 | Takaragi et al. |
| 4,926,480 A | 5/1990 | Chaum |
| 4,991,210 A | 2/1991 | Chaum |
| 5,005,200 A | 4/1991 | Fischer |
| 5,018,196 A | 5/1991 | Takaragi et al. |
| 5,131,039 A | 7/1992 | Chaum |
| 5,196,840 A | 3/1993 | Leith et al. |
| 5,214,702 A | 5/1993 | Fischer |
| 5,218,637 A | 6/1993 | Angebaud et al. |
| 5,311,595 A | 5/1994 | Bjerrum et al. |
| 5,335,278 A | 8/1994 | Matchett et al. |
| 5,351,293 A | 9/1994 | Michener et al. |
| 5,416,840 A | 5/1995 | Cane et al. |
| 5,442,707 A | 8/1995 | Miyaji et al. |
| 5,502,765 A | 3/1996 | Ishiguru et al. |
| 5,513,260 A | 4/1996 | Ryan |
| 5,513,272 A | 4/1996 | Bogosian, Jr. |
| 5,515,441 A | 5/1996 | Faucher |
| 5,548,106 A | 8/1996 | Liang et al. |

(Continued)

FOREIGN PATENT DOCUMENTS

JP 10229980 * 9/1998

(Continued)

OTHER PUBLICATIONS www.ffiec.gov/pdf/authentication_guidance.pdf Aug. 2001 (author unknown).*

(Continued)

*Primary Examiner*—Andrew J. Fischer
*Assistant Examiner*—John Winter
(74) *Attorney, Agent, or Firm*—Schwegman, Lundberg & Woessner, P.A.

(57) ABSTRACT

A system for permitting a secure electronic transaction on a network is disclosed. The network has a user device having a fingerprint, a provider's server and a means for providing verification of user's identity. In response to a request by the provider's server the means for providing verification positively identifies the fingerprint of the user device. It thereupon requests a confirmation from the user device of the transaction and upon receiving the confirmation completes the transaction.

11 Claims, 10 Drawing Sheets

U.S. PATENT DOCUMENTS

| | | | |
|---|---|---|---|
| 5,559,887 | A | 9/1996 | Davis et al. |
| 5,648,648 | A | 7/1997 | Chou |
| 5,657,389 | A * | 8/1997 | Houvener .................. 713/186 |
| 5,794,221 | A | 8/1998 | Egendorf |
| 5,845,267 | A | 12/1998 | Ronen |
| 5,852,812 | A | 12/1998 | Reeder |
| 5,899,980 | A | 5/1999 | Wilf et al. |
| 5,903,721 | A | 5/1999 | Sixtus |
| 5,905,736 | A | 5/1999 | Ronen et al. |
| 5,907,617 | A | 5/1999 | Ronning |
| 5,920,628 | A | 7/1999 | Indeck et al. |
| 5,933,497 | A | 8/1999 | Beetcher et al. |
| 6,026,166 | A | 2/2000 | LeBourgeois |
| 6,029,151 | A | 2/2000 | Nikander |
| 6,041,411 | A | 3/2000 | Wyatt |
| 6,138,239 | A | 10/2000 | Veil |
| 6,167,518 | A | 12/2000 | Padgett et al. |
| 6,195,447 | B1 | 2/2001 | Ross |
| 6,269,348 | B1 | 7/2001 | Pare, Jr. et al. |
| 6,270,011 | B1 | 8/2001 | Gottfried |
| 6,367,012 | B1 | 4/2002 | Atkinson et al. |
| 2001/0000535 | A1* | 4/2001 | Lapsley et al. ............... 705/64 |
| 2002/0174067 | A1* | 11/2002 | Hoffman et al. .............. 705/39 |
| 2004/0128249 | A1 | 7/2004 | Hoffman |
| 2005/0108177 | A1 | 5/2005 | Sancho |

FOREIGN PATENT DOCUMENTS

| | | |
|---|---|---|
| WO | WO98/47116 | 10/1998 |
| WO | WO-98/47116 | 10/1998 |
| WO | WO-98/59455 | 12/1998 |
| WO | WO98/59455 | 12/1998 |
| WO | WO-99/31610 | 6/1999 |
| WO | WO99/31610 | 6/1999 |
| WO | PCT/US00/21058 | 7/2000 |

OTHER PUBLICATIONS

Chaum, D., "Achieving Electronic Privacy", *Scientic American*, 267(2), (Aug. 1992), 8 pages.

CISCO, "Kerberos Overview—An Authentification Service for Open Network Systems", *Updated Jan. 14, 2003, Document ID: 16087.*

Gollmann, D., "What do we mean by Entity Authentication?", *IEEE Symposium on Security and Privacy*, (May 1996), 46-54.

McGhaw, L., "Connx Security White Paper", *Solutions IQ*, (Oct. 13, 1997).

Medvinsky, G., et al., "NetCash: a Design for Practical Electronic Currency on the Internet", *Information Sciences Institute, California*, (Mar. 1995), 5 pgs.

Needham, R, et al., "Using Encryption for Authentification in Large Networks of Computers", *Operating Systems 21* (12), Palo Alto Research Center, (Dec. 1978), 993-99.

Newman, B. Clifford, et al., "Proxy-Based Authorization and Accounting for Distributed Systems", *Proceedings of the 13th International Conference on Distributed Computing Systems*, (May 1993), 9 pgs.

Newman, B. Clifford, et al., "Requirements for Network Payment: The NetChecque Perspective,", *Proceedings of IEEE Compcon '95*, (Mar. 1995), 5 pgs.

Nicomette, V., et al., "An Authorization Scheme for Distributed Object Systems", *Proceedings of IEE Symposium on Security and Privacy*, (May 1977), 21-30.

Sirbu, M, et al., "NetBill: An Internet Commerce System Optimized for Network Delivererd Services", *Compcon '95*, (Mar. 1995), 20-35.

Tenenbaum, J., et al., "Spontaneous Electronic Commerce on the Internet", *COMPCON '95*, (Mar. 1995).

Tung, B, "The Moron's Guide to Kerberos, Version 1.2.2", http://www.isi.edu/gost/brian/security/kerberos.html, (Mar. 9, 2003), 1-11.

Wenbo, M, "On two proposals for On-Line Bankcard Payments using Open Networks: Problems and Solutions", Oakland, CA, (May 1996).

"2062.001US3 Non-final OA Jun. 25, 2007".

U.S. Appl. No. 09/500,601, Non-Final Office Action mailed May 2, 2002, 8.

U.S. Appl. No. 09/500,601, Non-Final Office Action mailed Jul. 12, 2005, 10.

U.S. Appl. No. 09/500,601, Response Filed Apr. 13, 2005 to Non-Final Office Action mailed Dec. 17, 2004, 13.

U.S. Appl. No. 09/500,601, Non-Final Office Action mailed Jul. 3, 2006, 15.

U.S. Appl. No. 09/500,601, Response filed Dec. 18, 2006 to Non-Final Office Action mailed Jul. 3, 2006, 11.

U.S. Appl. No. 09/500,601, Response filed May 22, 2007 final office action mailed Mar. 22, 2007 15 pgs.

U.S. Appl. No. 09/500,601, Non-Final Office Action mailed May 5, 2004, 10.

U.S. Appl. No. 09/500,601, Non-Final Office Action mailed Dec. 17, 2004, 13.

U.S. Appl. No. 09/500,601, Non-Final Office Action mailed Sep. 10, 2004, 12.

U.S. Appl. No. 10/444,506 Non-Final Office Action mailed Nov. 9, 2006, 26.

U.S. Appl. No. 10/444,506, Response filed Apr. 9, 2007 to Non-Final Office Action mailed Nov. 9, 2006, 15.

U.S. Appl. No. 10/688,734 Non-Final Office Action mailed Apr. 19, 2007, 6.

U.S. Appl. No. 10/688,734, Non-Final Office Action mailed Dec. 17, 2004, 8.

U.S. Appl. No. 10/688,734, Response filed Apr. 18, 2005 to Non-Final Office Action mailed Dec. 17, 2004, 7.

U.S. Appl. No. 10/776,954 Non-Final Office Action mailed Mar. 22, 2005, 12 pgs.

U.S. Appl. No. 90/500,601, Response filed Aug. 2, 2002 to Non-Final Office Action mailed May 2, 2002, 8.

U.S. Appl. No. 10/688,734 Response Filed May 18, 2007 to Final Office Action mailed Apr. 19, 2007, 3.

U.S. Appl. No. 10/688,734, Non-Final Office Action mailed May 4, 2006, 5.

U.S. Appl. No. 10/688,734 Non-Final Office Action mailed Jun. 25, 2007, 8.

U.S. Appl. No. 10/688,734 Non-Final Office Action mailed Oct. 11, 2006, 4.

U.S. Appl. No. 10/688,734 Non-Final Office Action mailed Oct. 21, 2005, 6.

U.S. Appl. No. 10/688,734 Response filed Jan. 10, 2006 to Non-Final Office Action mailed Oct. 21, 2005, 7.

U.S. Appl. No. 10/688,734 Response Filed Jun. 27, 2006 to Non-Final Office Action mailed May 4, 2006, 6.

U.S. Appl. No. 10/776,954 Non-Final Office Action mailed Mar. 22, 2005, 16.

"U.S. Appl. No. 09/500,601, Response filed Oct. 19, 2007 to Non-Final Office Action mailed Mar. 22, 2007", 14 pgs.

"U.S. Appl. No. 10/688,734, Non-Final Office Action mailed Oct. 31, 2007", OARN, 7 pgs.

"U.S. Appl. No. 10/688,734, Response filed Nov. 27, 2007 to Non-Final Office Action mailed OCt. 31, 2007", 8 pgs.

* cited by examiner

SYSTEM AND METHOD FOR SECURE NETWORK PURCHASING

CROSS-REFERENCE TO RELATED APPLICATIONS

The present application claims priority on WO 01/09756, PCT/US00/21058 filed Jul. 31, 2000. The present application also claims the priority of the following U.S. patent applications: U.S. application Ser. No. 09/523,902, filed Mar. 13, 2000, which is a continuation in part of U.S. application Ser. No. 09/500,601, filed Feb. 8, 2000 and claims the benefit of priority to U.S. Provisional application Ser. No. 60/167,352, filed Nov. 24, 1999 and U.S. Provisional application Ser. No. 60/146,628, filed Jul. 30, 1999. The specifications of these applications are hereby incorporated herein by reference in their entireties.

FIELD AND BACKGROUND OF THE INVENTION

The present invention relates to systems and methods for implementing secure transactions including but not limited to purchases over a computer network. More particularly, the methods described herein relate to a system which permits users of a network to perform transactions such as banking, purchases of merchandise and/or services and other transactions to be made over a computer network, whereby the purchaser may feel confident that information including but not limited to private personal information such as credit card or other payment information is not at risk of being diverted, misappropriated or stolen and the vendor may be more confident that the purchaser is bona fide.

The present invention permits one or more parties to a transaction to have confidence that the other party to the transaction is who he or she purports to be. This may be accomplished by the use of a "fingerprint" of the computer or other device used by such party and/or the use of a one time password. The fingerprint of the computer or other device used for the transaction provides significant security for parties to a transaction. If additional security is desired or if for example the computer or other device used in the transaction is not secure and available for use by third parties a one time password may also be used. The one time password concept of the present invention changes the password every time a request for authentication is made so that the next time the user of the computer or other device is the subject of an authentication request, the new password is required for this authentication and a new password is generated for the subsequent request. The one time password is described in further detail below.

It is well known for members of the public to access the global client/server network commonly referred to as the Internet, a part of which is the World Wide Web, for the purpose of searching for and purchasing merchandise from on-line vendors selling wares ranging from travel services and investment services to buying CD recordings; books, software, computer hardware and the like. Numerous patents teach methods or systems purporting to secure commercial credit card transactions carried out over the Internet. Examples of such patents include U.S. Pat. No. 5,671,279 to Elgamal, U.S. Pat. No. 5,727,163 to Bezos, U.S. Pat. No. 5,822,737 to Ogram, U.S. Pat. No. 5,899,980 to Wilf et al. and U.S. Pat. Nos. 5,715,314 and 5,909,492, both to Payne, et al-, the disclosures of which are incorporated by reference herein.

Most of the disclosed systems have the disadvantage that they rely on the transmission of sensitive information over unsecured network routes and lines for each transaction. Although practically speaking, the systems which rely solely on encryption are fairly safe, there is still some risk of credit card misappropriation and there is little psychological comfort given to potential users by their knowing that encryption is being used. In addition, the merchant does not know whether the person making the purchase is actually the person whose name is on the credit card Generally speaking, the Internet is a network of computers, remote from one another linked by a variety of communications lines including telephone lines, cable television lines, satellite link-ups, wireless networks and the like. Internet service providers (hereinafter "ISPs") provide the link to the main backbone of the Internet for small end users. The account for the end user is established in the normal manner usually by providing credit card information to the ISP by conventional means, such as by voice telephony, fax transmission or check. In most ISP-end user relationships, the ISP has been given credit card or other credit account information, which information is on file with the ISP and available to the ISP's computers. In return for receiving payment, the ISP provides a gateway to the Internet for the end-user's use. The end-user (or user) is provided with Identification codes for dialing directly into the ISP's computers and software means (for example, dialer software, browser software, electronic mail software, and the like) for doing so if necessary.

Most purchases are conducted in the following manner: a purchaser using a browser application on his local client computer connects via his computer's modem to a dial-up Internet Service Provider (hereinafter "ISP") and makes connections through the ISP to various Web sites, i.e. Internet server locations assigned a URL (Uniform Resource Locator) address. The purchaser selects his merchandise and the vendor usually requests payment by one of several methods, one of which may include payment by providing credit card information.

According to surveys and other marketing data, there always has been and there still exists a high percentage of the population which is deterred from purchasing merchandise directly over the Internet. This large percentage of the population apparently fears that, despite all the efforts at security and cryptography promised by the vendors, there still exists the possibility that their credit account information will be intercepted on-line by a third party computer hacker and used illegally, at great expense and trouble for the cardholder.

An additional anxiety-inducing factor related to merchandising over the Internet, or e-Commerce, is that the vendor cannot always be certain that just because he has obtained credit card or account information, that he will actually be paid for the merchandise he ships. After all, credit card fraud and/or theft occurs regularly and may not be caught in time to stop the order from being shipped. When the cardholder discovers the theft and stops the card, it may be too late for the vendor to recover the shipped goods. At the very least, this situation leads to unnecessary aggravation and wasted resources for the vendor, credit card company and cardholder.

OBJECTS OF THE INVENTION

Thus, it is an object of the present invention to provide a system and method for implementing secure transactions including but not limited to purchases over a computer network.

It is another object of the invention to provide a system and method for permitting users of a network to perform transactions such as banking, purchases of merchandise and/or services and other transactions to be made over a computer network.

It is an object of the invention to provide a system and method whereby the user may feel confident that information including but not limited to private personal information such as credit card or other payment information is not at risk of being diverted, misappropriated or stolen and the supplier may be more confident that the user is bona fide.

It is also an object of the present invention to provide a system and method that permits one or more parties to a transaction to have confidence that the other party to the transaction is who he or she purports to be.

It is a still further object of the invention to provide a system and method whereby a "fingerprint" of the computer or other device used by a party to a transaction is used for security purposes.

It is another object of the invention whereby a one time password may be used to provide security for a transaction.

It is an objective of the present invention to provide a system and method for on-line purchasers of merchandise marketed over the Internet to pay for those purchases with minimized exposure to the risk of billing information theft by electronic interception.

It is an objective of the present invention to provide a system and method for on-line purchasers of merchandise marketed over the Internet to pay for those purchases with minimized exposure to the risk of credit card theft by electronic interception.

It is a further objective of the invention to provide a mechanism for facilitating e-commerce which will increase the confidence of the consuming public in the safety of such transactions.

It is still a further objective of the invention to provide a mechanism for facilitating e-commerce which will increase the confidence with which vendors may ship the purchased product or deliver the purchased service without fear of the payment being provided fraudulently.

It is yet a further object of the present invention to provide a site-specific and computer-specific identification confirmation system for use in a secure electronic purchasing system, or other secure electronic transaction systems like authenticating, access permission, etc.

It is indeed a further object of the present invention to provide a method for encoding downloadable data or data content files, including but not limited to MP3 music files, graphic files, e-books, medical records, government databases such as tax return information and the like so that the files can only be accessed by the actual purchaser of the file and preferably only from the computer to which they were downloaded, or to a limitable number of secondary authorized devices.

SUMMARY OF THE INVENTION

The objectives and others not specifically enumerated herein are achieved by the invention disclosed herein which comprises a system and method for providing transfer of a deliverable which may be goods and services or may include information, data or anything else to a recipient who meets the selected criteria. In the case of goods and services, the recipient may be a trustworthy purchaser who provides, through the system, a commitment for payment to an on-line vendor for services or goods provided to an on-line user. In the present invention the recipient will receive the deliverable without having sensitive identifying information such as credit card information passing over the public and unsecured Internet. The system and method of the present invention provides added security and comfort by providing, among other features, the comfort of knowing that an independent, uninterested third-party is confirming the identities of the parties involved and the validity of each and every transaction, in real time, and the further security of knowing that at no time is the user's critical information, such as credit card information, being exposed over the World Wide Web.

In one embodiment, the method takes advantage of an existing relationship between the recipient with one or more computers/servers belonging to a provider or a third party working with either the provider or the recipient linked by a variety of communications lines including telephone lines, cable television lines, satellite link-ups a wireless network and the like. An account for the recipient is established usually by providing identifying information to a provider. The recipient is provided with identification codes for dialing directly into the provider's computers and software means (for example, dialer software, browser software, electronic mail software, and the like) for doing so if necessary. Each time a user signs in to the provider's computers for an on-line session, the user is assigned an identifying code or address. The recipient's computer transmits messages which are received by the provider's computer. During the entire time the on-line session in progress, the identifying code or address does not change and is thus available as identifying information. By monitoring and occasionally re-verifying that the user's computer is still on-line at the assigned address, the provider can confirm that certain activities could be attributed to the user.

One example of this process would be when a bank customer wants to be authenticated to log into his or her bank account. The authentication would be done after the user has connected to the Internet through his or her ISP or other network and goes to the bank's website or other database to access personal information. The user would be authenticated by the present invention prior to being allowed access to the financial information.

In another-exemplary embodiment, the method takes advantage of the existing business relationships between the end user with the owners of member computers/servers who give access to the backbone structure of the Internet. As explained hereinabove, the Internet is a network of servers, remote from one another linked by a variety of communications lines including telephone lines, cable television lines, satellite link-ups and the like. Internet service providers (hereinafter "ISPs") provide the link to the main backbone of the Internet for small end users. The account for the end user is established in the normal manner usually by providing credit card information to the ISP by conventional means, such as by voice telephony, fax transmission or check. In most ISP-end user relationships, the ISP has been given credit card or other credit account information, which information is on file with the ISP and available to the ISP's computers. In return for receiving payment, the ISP provides a gateway to the Internet for the end-user's use. The end-user (or subscriber) is provided with identification codes for dialing directly into the ISP's computers and software means (for example, dialer software, browser software, electronic mail software, and the like) for doing so if necessary.

Each time a user signs in to the ISP's computers for an on-line session, the user is assigned an Internet Protocol (hereinafter "IP") address. The user's computer transmits messages which are received by the ISP computer and relayed through the IP address and out onto the Internet to the ultimate intended recipient computer. During the entire time the on-line session in progress, the IP address does not change and is thus available as identifying information. By monitoring and occasionally re-verifying that the user's computer is still on-line at the assigned IP address, the ISP can confirm that certain activities could be attributed to the user.

In another embodiment of the invention, where a transaction is to take place a user logs into a network which may be the Internet or some other public or private network, LAN or WAN. When the user accesses the desired location whether it be a website or other location the fingerprint of the computer or other device that accessed location takes a finger print of the user's device. This fingerprint may be of the device's hardware and/or software and/or other attribute that may provide a unique definition. This fingerprint may be used throughout the initial transaction to make sure that the device online continues to be the same device or the fingerprint may be a signature for use in other transactions from that device.

A further embodiment of the present invention takes advantage of the relationship which is re-created every time an Internet user's computer goes online and signs into his ISP's computer by assigning to the ISP computer the function of clearinghouse and active intermediary between the user's computer and the vendor's computer. A user computer signs in to the ISP computer system and is recognized and assigned an IP address. When the user identifies merchandise or services at a vendor's website which he wishes to purchase, he sends programming to the website which selects the items and instructs the vendor's computer to generate a purchase authorization request which is sent to the ISP computer. The purchase authorization request contains information about the merchandise to be purchased, identifying information about the proposed purchaser, some of which is the identifying information assigned by the ISP to the user. The ISP computer confirms internally that the user is still signed in to the ISP computer system by verifying the identity of the computer currently actively communicating through the IP address. When satisfied that the user is still online, the ISP computer generates and sends a message to the user's computer requesting confirmation of the order for the merchandise. Upon receipt from the user's computer of the confirmation, the ISP generates and transmits to the vendor's computer a message confirming the order and providing a confirmation number, agreeing to pay the invoice which the vendor's computer subsequently generates and presents to the ISP computer. The ISP computer then uses the user's credit card information and presents an invoice against the credit card account to be sent through normal channels.

In another exemplary embodiment of the present invention, the ISP does not serve as the credit giver or transaction verifier/guarantor. This function is provided by a bank or vendor with whom the user already has a credit account, and who has an online presence, i.e. has a transaction server connected to the Internet which can participate in the transaction as it is carried out by the user/consumer.

Another aspect of the present invention lies in the security provided by employing a method for verifying that the system is only usable by computers specifically registered with the system. More particularly, the method for identifying a registered computer, i.e. one which can be used for making a purchase transaction, or other electronic transaction and/or request, on the system of the invention, is constructed such that if a hacker were to try to "pretend" that his computer was in fact the registered computer of a bona fide user, the codes detect that they are no longer in their originally installed environment and the user's identity becomes inoperable. The system can only be reactivated by re-registering the machine.

In another aspect of the present invention, the system is configured such that the request for a confirmation of a purchase transaction, or other electronic transaction, is forwarded in the form of an SMS (short message system) note to a user's cellular communications device, such as a cellular phone, alphanumeric pager or modem-equipped handheld computer. Thus, if the user was not sitting at the system registered computer, he can still be advised instantly that someone else, perhaps illegally, is attempting to fraudulently use his account or even his computer to make a purchase. This feature of the invention can contribute to deterring such computer fraud.

In a still further embodiment of the present invention there is a system and method of performing secure transactions by the use of a one time password. In this embodiment, there are two different passwords. The first is a login password. This password is always the same unless changed by the user. The login password and the fingerprint decrypt a one time password that may be used to secure a transaction. The combination of the login password and the fingerprint permits the user to receive an encrypted, one time password and decrypt it. This password is changed for each transaction and is not repeated, thus providing superior security for a given transaction.

BRIEF DESCRIPTION OF THE DRAWINGS

For a better understanding of the invention, the following drawings are included for consideration in combination with the detailed specification which follows.

DETAILED DESCRIPTION OF THE EXEMPLARY EMBODIMENTS

Figure 2:
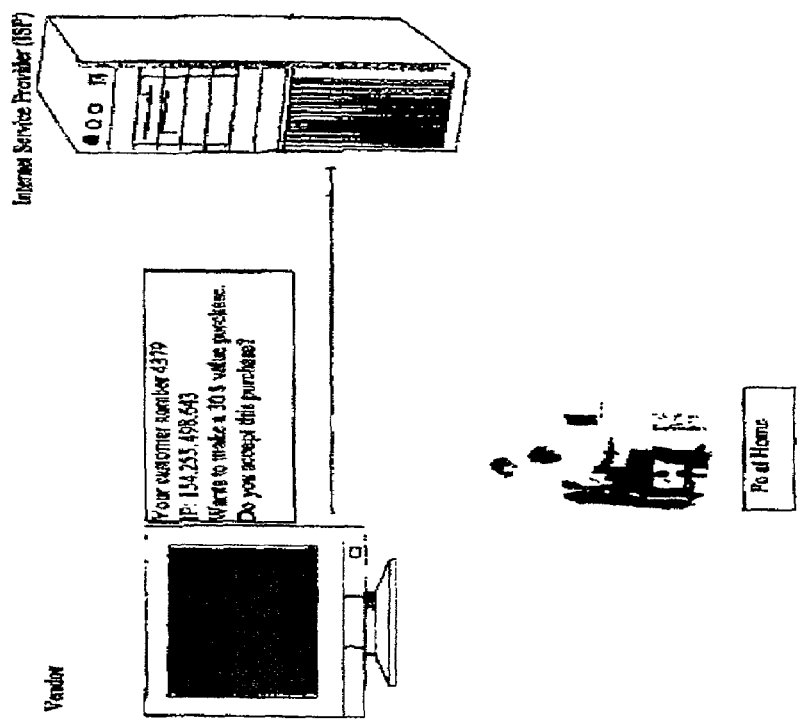
FIG. 2 shows the vendor computer communicating with the ISP computer to request authorization to complete user's requested transaction.
Figure 1:
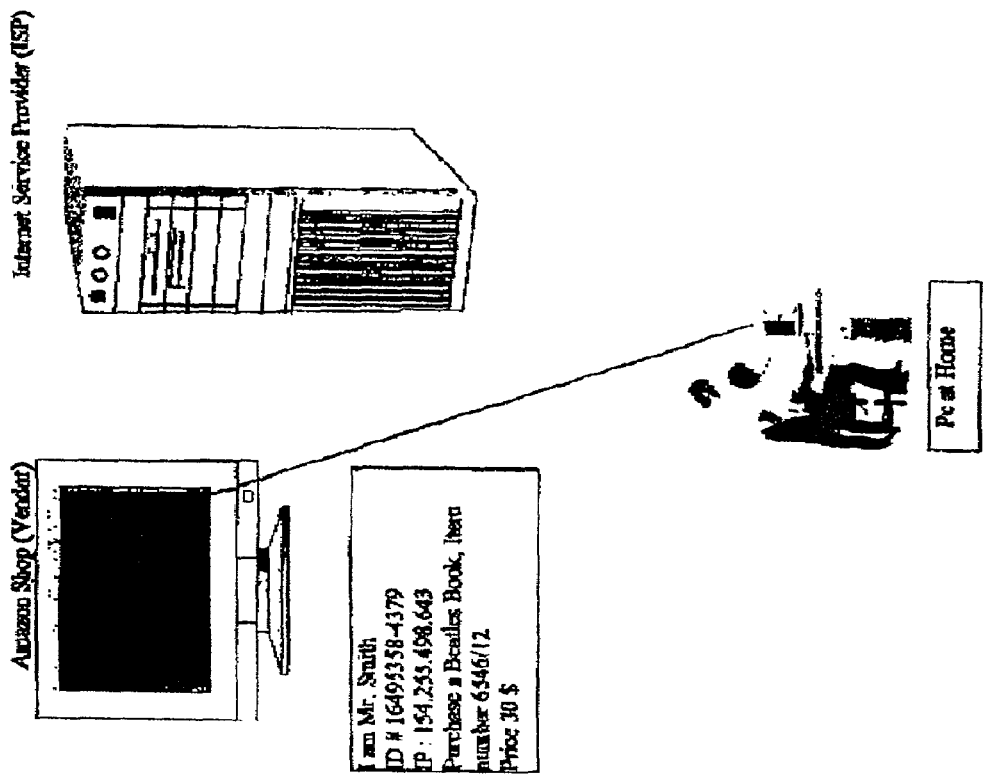
FIG. 1 shows a user computer in communication with a vendor computer via the ISP computer, wherein user computer is initiating a purchase transaction.
Figure 3:
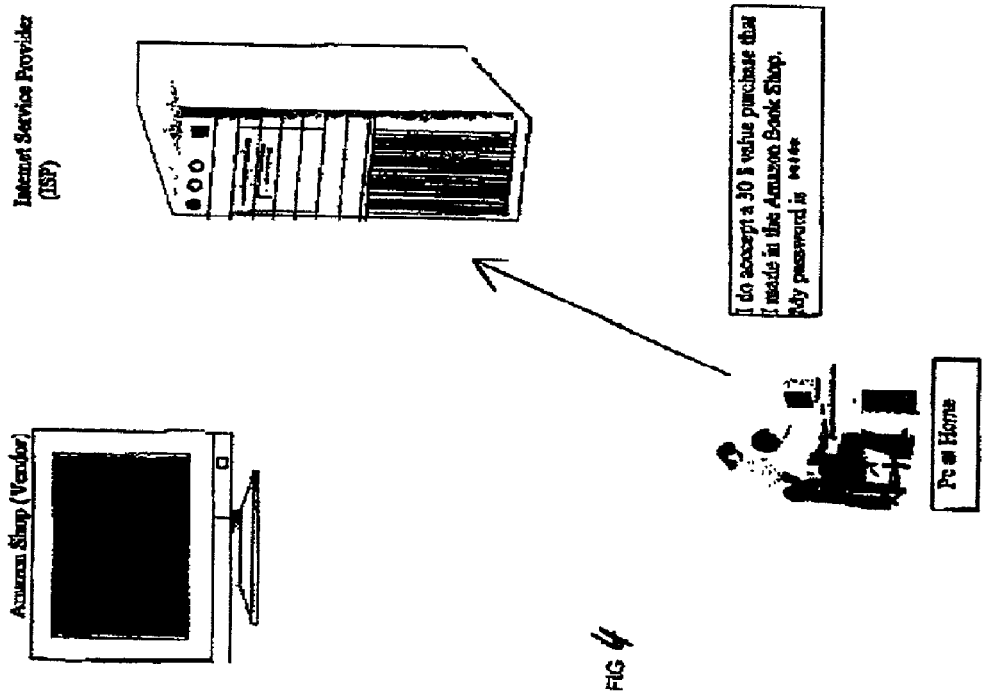
FIG. 3 shows the ISP computer confirming that correct IP address is active with user's computer and requesting confirmation of user's transaction.
Figure 4:
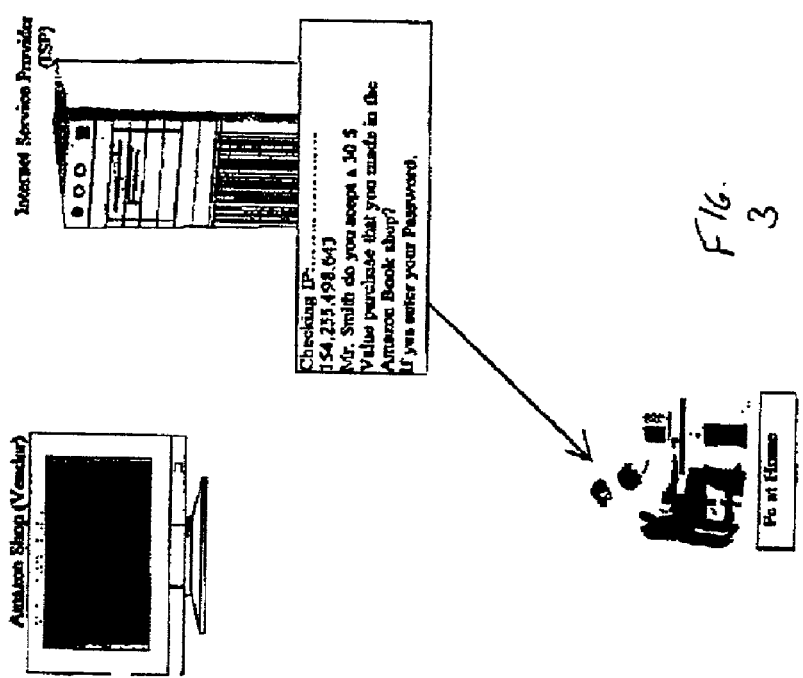
FIG. 4 shows users computer responding to ISP computer's request for confirmation.
Figure 5:
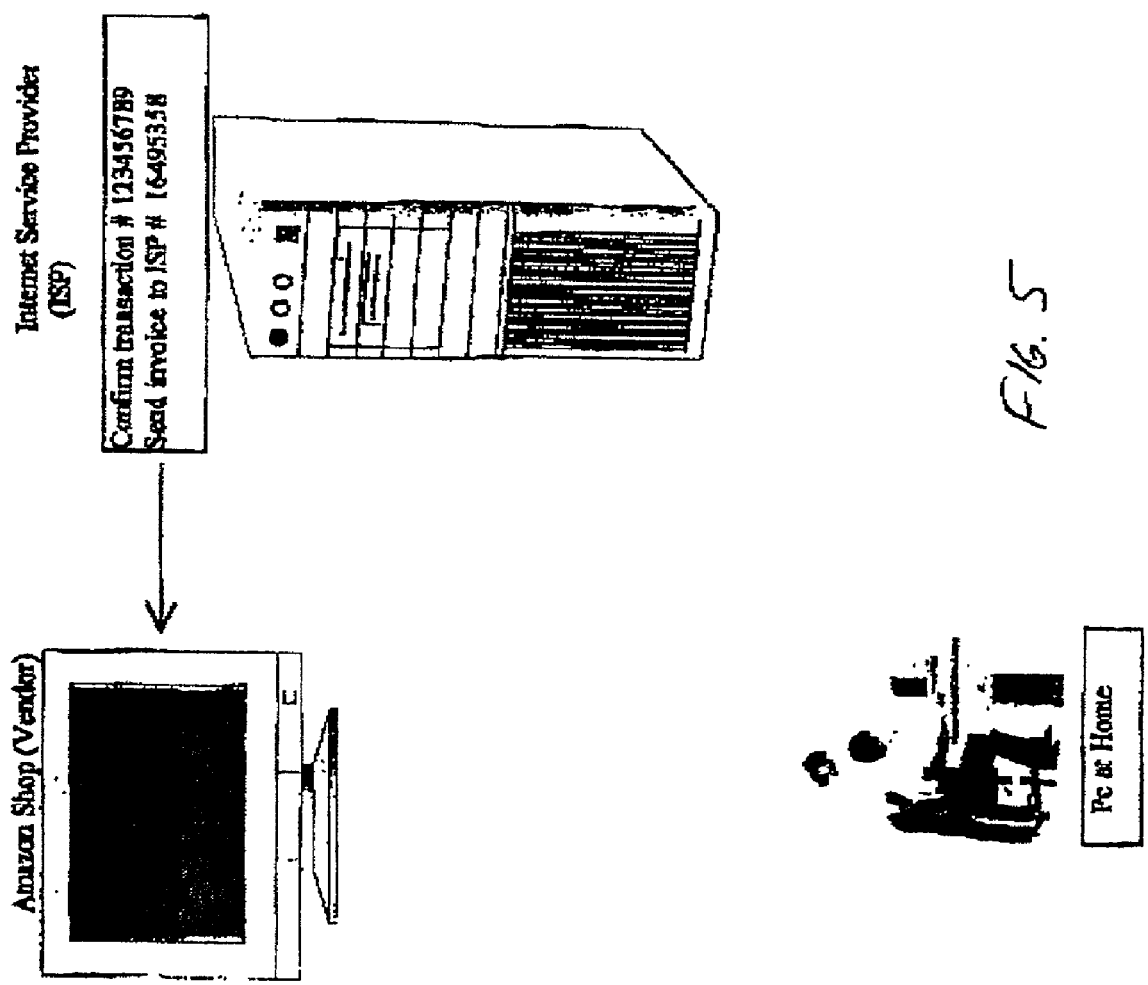
FIG. 5 shows ISP computer's transmission of a confirmation code and invoicing instructions to vendor's computer.

In all of the exemplary embodiments which will be described hereinbelow, there are certain common features which, together with reference to the drawings, will be described once here to provide the reader with an easily understood framework.

Many devices today have unique hardware fingerprints. For example, the identity of the processor, its type and clock speed, the hard drive manufacturer, the size of the hard drive, the amount of Ram, etc., all combine to make each device relatively unique. Other devices have similar fingerprints or can be provided with such relatively easily. These products include cell phones, PDA's televisions web accessing apparatus and other devices commonly available. These fingerprints can be combined with a user identifying code so that a purveyor of goods or services can have increased assurance of the bona fides of the person using this equipment to buy these goods and service or access information.

As was discussed above, the present invention takes advantage of an existing relationship between the user or recipient with one or more computers/servers belonging to a provider or a third party working with either the provider or the recipient. These computers/servers are linked by a variety of communications lines including telephone lines, cable television lines, satellite link-ups a wireless network and the like. An account for the recipient is established usually by providing identifying information to a provider or a third party. The recipient is provided with identification codes for dialing directly into the provider's computers and software means (for example, dialer software, browser software, electronic mail software, and the like) for doing so if necessary. Each time a user signs in to the provider's computers for an on-line session, the user is assigned an identifying code or address. These codes may be assigned by the provider, a third party or an ISP. The recipient's computer transmits messages which are received by the provider's computer. During the entire time the on-line session is in progress, the identifying code or address does not change and is thus available as identifying information. By monitoring and occasionally re-verifying that the user's computer is still on-line at the assigned address, the provider can confirm that certain activities could be attributed to the user.

Alternatively, instead of relying on the presence of the identifying code or address of an ISP provider, the provider's device such as a computer or server takes a fingerprint of the user's device. This fingerprint can be of the device's hardware, software or other attribute and combinations thereof. If the provider's computer desires to ascertain whether the user is still the same user in an extended transaction or the same user in a previous transaction, the fingerprint can be taken and compared to an earlier fingerprint The present invention is designed to reduce compromising the security of one's accessing information which may for example be credit account information or other relevant information which can be caused by transmitting the information over the unsecured World Wide Web. Additionally, the invention helps to ascertain that the parties participating in a transaction are who they purport to be. The exemplary embodiments assume the following arrangement of the parties to a transaction:

[a] a user is connected via his PC or client to the Internet through telephone, cable TV, satellite or data lines, usually through a modem and the user's client PC has installed therein a browser program. such as Microsoft Corporation's Internet Explorer or Netscape Corporation's Navigator or Communicator, an instance of which has been activated prior to the transaction;

[b] a vendor has a server in communication with the Internet which constitutes or communicates a Website accessible to users' browser,

[c] a security administration system operates via a security server, or toolbox (hereinafter 'TB"), the physical location of which can vary as will be discussed below; and

[d] a creditor or payment guarantor has a payment server, although this function may optionally be performed by the security server. In the context of the present application, it should be understood that reference to a client or PC expressly includes any browser-equipped telecommunications device which gives the user the ability to access and interface with remote servers, and in particular Web sites on the Internet. Thus, such devices include browser-equipped cellular phones, personal digital assistants, palm held computers, laptop computers, and desktop PCs, though not exclusively.

Additionally, it should be noted here that, rather than being a vendor of merchandise, vendor might simply be a provider of an information or financial service, as example. Thus vendor might be using the present invention to ensure that access to secured databases is only to properly authorized and duly-identified persons.

All of the four components of the system employ a combination of security measures, for instance, all transmissions preferably take place in an encrypted environment, such as RSA, Triple DES, etc., using encryption tables which are replaceable by the security server or by a central system administrator server at random intervals.

The systems are of two general kinds; where the ISP will participate in the system, giving the highest possible level of security, and where the ISP is not a participant in the system. Where the ISP is a participant, it can participate in three aspects;

[1] the ISP is a mere intermediary of the communications between the recipient and the provider,

[2] the ISP can serve as the physical host of the TB and

[3] the ISP can be the creditor or payment guarantor, since the ISP already has an ongoing service agreement with the user.

Where the ISP is not a participant as a creditor or payment guarantor, this function can be served by another party. In this instance the ISP may have no function at all. An example of this situation would be a LAN or a WAN which may be either public or private. There can be any suitable provider who performs a function at the request of the user and receives some consideration in return or enables collection of compensation for a third party. The advantage to having the ISP as participant wherein the TB is physically at the site of the ISP has been alluded to above. That advantage lies in the fact that since most users dial into an ISP's modem basket over copper phone lines, the only way for a hacker to get between the ISP server (and the TB if installed piggyback to the ISP server) and the user is to physically tap into a phone company junction box, something that most hackers are not likely to do. Even if the TB is at another physical location, the system still retains effectiveness but the fewer areas open for hacker attack, the better. If the ISP is not a participant, insofar as being a creditor or payment guarantor, this function can be fulfilled by the Internet-accessible payment servers of such business entities as online banks, merchants which give their customers credit accounts and other credit-providing institutions. In such a case, the TB might be located at the site of the credit institution, or in fact a single server could act as the TB as well as the payment server. In another case, the TB and the payment server might be at completely different locations.

Before a transaction can take place, the components of the system need to be programmed and/or installed as follows:

The TB is at least on server and preferably a series of at least three servers and in addition a Firewall Server. The TB also may contain a database comprised of all of the security system's user participants. Additionally, TB can include programming to check and update the recipient or user's software version, and encryption tables and instructions to either update those tables as needed, mark them for future updating or to direct user's browser to the URL of an appropriate server, such as the central administrator server for downloading updated tables. The vendor server is modified such that a button or other directing device is added to the purchase initiating software that gets downloaded to a users browser from the vendor server when a user indicates readiness to commit to a transaction such as to pay for a transaction. The added button tells a user to click on it if payment by the secured system of the invention is desired. By clicking the button, the user initiates a series of events which will be described further below.

The creditor server is provided with programming directing it how to respond to the request from a vendor server for payment on a transaction that is accompanied by a Gatepost code, which the vendor receives from the TB. The TB records all transaction data and assigns a unique transaction ID (UTID) to the record and further marks the record as "not yet confirmed". TB records the transaction data received from the vendor server and puts it under a URL. TB then commands User's waiting thread to come and retrieve the page at the URL on the TB and show it to User. The shown page is the Confirmation Request page which appears to user on client PC as a Pop Up window.

In the Pop Up window, User sees certain details of the transaction and text to the following effect "We have been asked to pay a vendor 517.20 for an order from you. Do you approve the transaction?". To approve the transaction, User is instructed to input his System password (selected in the registration process) and click the OK button.

a) If the User clicks Reject or does not respond within a predetermined time frame then the order is deemed not accepted and TB rejects Vendor's request for payment URL.

b) If the User accepts the transaction by entering his personal password into the appropriate field and clicking the OK button the client software closes the confirmation request window and decrypts a one time password using a key generated from the personal password and sends it back to the TB.

c) In one exemplary embodiment of the present invention, the User can elect to additionally receive notice on his phone or other communication device preferably a cellular phone or other cellular-enabled device (such as an alphanumeric beeper or an Internet-ready personal digital assistant or PDA) of the transmission of a Confirmation Request page to his PC. When User has elected this service, the transmission to his PC of a Confirmation Request page is accompanied by the simultaneous transmission of an SMS (Short Message System) message to his cellular device, thereby advising him that someone is operating his PC and conducting a purchase transaction. Using this follow-me technology, a user might then use his cellular device to respond to the SMS message with a message to cancel the transaction and/or initiate a trace of the fraudulent purchase request.

The transaction continues as follows in the embodiment wherein the Toolbox is located at the vendor or at the secure administration site, for example. Physical Placement of TB in an exemplary embodiment of the invention, the TB is at the secure administration site or at the vendor site. In the case of the TB being at the vendor site, the TB is locally connected to the service provider's server. The user is not necessarily purchasing merchandise, but, for example, is making a request to the vendor server for access to secured databases contained therein or protected thereby. Thus, in order to be certain that the user is who he claims to be the user is forwarded to the TB server to be authenticated. The rest of the procedure is substantially the same as described above.

As noted above, rather than being a vendor of merchandise, vendor might simply be a provider of an information or financial service, as example. Thus vendor might be using the present invention to ensure that access to secured databases is only to properly authorized and duly-identified persons. For example, a bank might want identity verification before permitting a customer access to his account information or to use financial services. As another example, a large corporation might use the present invention to give third-party verification of an employee's or outside contractor's identity before permitting them access to secured databases which might not otherwise be available via the Internet.

The TB may be, for example, a mini-server, dedicated to the security tasks assigned to it. The TB is provided with programming which, when activated, sends, receives and verifies the proper forms and/or data to either a participating home user, ISP server or vendor in order to carry out the proposed transaction.

The authentication agent (hereinafter "AA"), may be software downloaded into the client computer, AA, which will be further described below. The AA generally performs the same function as a magnetic strip on a plastic card, e.g., a credit card. This enables the AA to be employed in internet generated automatic teller machine (ATM) applications, such as fund transfers, credit card or debit card credits or debits, without the need for physical access to the ATM.

The procedure described in this embodiment above is described as follows.

1) In one embodiment of the present invention, AA sends SIMULTANEOUS messages to vendor and TB, so that the TB is expecting a certain message from the vendor.

2) The AA's action is described below. In the present embodiment the AA is a COM object which creates a "digital fingerprint" consisting of various identifying hardware characteristics which it collects from the user's PC, as well as passwords (to be described further). Activation of the account initiates a process by which the TB records a fingerprint for the user, which the AA has derived, including a unique identification ("UID") for the user, using the identifying characteristics of user's PC (e.g CPU ID number, hard disk serial number, amount of RAM. BIOS version and type, etc-).

3) When a transaction starts, the user's AA, which is a simple DLL, is activated by the vendor script. The AA sends a message to the Toolbox server, using the server's public key. If the server answers the AA, the home user's computer knows that it is talking to the correct server, since only the Toolbox has the private key that can decrypt the message sent with its public key. The Toolbox server now sends the user half of a new Triple DES key that it has generated so that the home user can communicate with it securely. Next the TB asks for the user's OTP (one time password) which is stored on a configuration file in the home user's computer. This configuration file can only be opened by a combination of personal password and CPU id. If the home user's computer responds with the correct password, the TB knows it is talking to the correct user. Once the TB has verified that it is talking to the correct user, the TB sends a dynamically generated smart DLL to collect the computer's hardware signature, verifying that it is also talking to the correct machine. The TB also records the number of encounters with the user. Any hacker who manages access probably fails this check, and is thereby discovered. The configuration file, which contains the account ID, machine ID, and a replaceable one-time password, among other items, can be stored or on the hard drive or on a removable floppy, i.e., the configuration file can be removed and taken away from the proximity of the user's computer, thereby disabling the user's access to the account from that computer. When registering for the first time, and also when authenticating a user, the simple DLL loads itself into memory, and calls a "smart" DLL, from a collection of thousands of continuously regenerated smart DLL's, which collects a large number of different parameters, for example 12, identifying the user's computer. A simple example of an authentication transaction is now described using two machine parameters. The DLL applies an algorithm such that if the disk serial number is 1 and is multiplied by 1; and if the CPU serial number is 2 and is multiplied by 2, the resulting string is their sum or "5". Thus, 1(1); 2(2)=5. This information is hashed by the DLL according to that DLL's hashing programming, then encrypted, and the encrypted hash is sent back to the TB. The order of the parameters and the algorithm used can change each time. Furthermore, the actual information is further interspersed with "garbage" code, expected by the TB, every time. The server receives the hashed and encrypted result from the smart DLL, and compares it to the result which it expects to receive. This is done by the TB by calculating the expected result by running it's own copy of the unique DLL on the user's identifying parameters that it has stored in the database. It then hashes the result, and compares its hash to the de-encrypted hash string it received from the user.

An exemplary embodiment of the present invention, more specifically uses a 2048 bit RSA key to initiate the handshake, and thereafter moves to Triple DES encryption. The Public Key is distributed to all the end-users with the Agent and the Private Key(s) are held by the AA Server There is a different set of Keys for different Providers, i.e., Credit Card Companies, Banks, etc.

The TB can be used to verify a digital fingerprint in various forms of Internet transactions, for example:

Banking and Financial Services

A bank or financial institution can use digital fingerprints to provide customers with secure access to their accounts for stock transactions and account management. Customers can use their digital fingerprints as a universal log-in at the bank's Web site for quick access to their account information without having to remember a unique log-in name and password. To further enhance each user's experience, the bank can provide targeted content and services to its customers based on the registration information contained in their digital fingerprints. The bank can also use digital fingerprints to send secure e-mail, allowing it to pro-actively send private account information to its customers.

In an alternative embodiment, the present invention may be used to help track down credit card fraud. If a computer has been used for certain transactions where the credit has been rejected for various reasons the fingerprint can be used to create a database so that future purchases from that location may be subjected to greater scrutiny. In another embodiment that has applicability not only in the banking and financial services industry is the use of the present invention to provide an electronic signature. Secure electronic signatures are increasingly sought to provide both the customer and a provider with security. Electronic signatures are becoming more important in many banking and financial transactions as well as in other areas where a traditional signature is required such as contracts and other legal types of documents. The security features of the present invention may be used to provide a secure electronic signature that the recipient will have confidence as to the bona fides thereof.

Retail

A manager of an online retail store can watch customers browse merchandise, identify purchase patterns, observe the behavior of casual visitors, and set up accounts for purchases. A manager of a retail Internet site can perform these same functions online by using digital fingerprints. By implementing client authentication with digital fingerprints, the retail site can analyze customer interests and behaviors, track and compare the profiles of visitors who browse and those who actually place orders, and perform market analysis and segmentation based on information presented in its customers' digital fingerprints. The site can extend the power of digital fingerprints by linking the ID to information in its existing customer database (e.g. customer's account, order status, or purchase history).

Additionally, by using the one-step registration feature of digital fingerprints, the site can quickly find out information about first-time visitors to the site. The site can use this information to provide relevant content to these visitors, thus capturing their interest and increasing the likelihood that they will become customers. The authentication and security associated with digital fingerprints can allow the site to verify the identity of a customer, eliminating consumer misrepresentation and false orders. Additionally, consumers will have more confidence in conducting transactions on the Internet.

Debit Card Transactions

Currently, when someone wants to purchase something on the Internet they go to an e-commerce website and enter their personal credit card information. This information then gets sent to both the eMerchant and the card-issuing bank to verify that the customer has sufficient funds to make the purchase. Although this process checks to make sure the customer has sufficient funds, what it does not check is the card owner's identity to ensure that he is the one who is really making the purchase. This is where the present invention has significant advantages.

The system of the present invention provides the authentication necessary to verify that the true owner of the card is making the purchase and not a waiter, hacker, or a gas station attendant stealing someone's card information and online identity. When a card issuing bank issues a Visa™ or MasterCard™ debit card, the card owner goes onto the Internet and creates his digital identity. He does this by accessing the issuing banks website and downloading a small software agent. Once downloaded, a button is now located on the users browser that will allow him to make secure Internet purchases.

When a Visa™ or MasterCard™ debit card owner wants to make an Internet purchase, he would go to an eMerchant website where he would like to make a purchase. After choosing the item(s) he wishes to purchase on the eMerchant website, a user would click on checkout and will be forwarded to the checkout page of the eMerchant website. This is a typical example, and is unaffected to this point by the system of the present invention. At the checkout page, a user will need to choose a payment method. In order for a user to be approved by his card-issuing bank, he can be required to provide authentication such as by first clicking on an authentication icon located on his computer icon tray. This icon will establish a secure link with the server. The user will now proceed with the purchase as normal by choosing MasterCard™ or Visa™ depending on the card type and enters his card information for payment. Once entered, the user may click "purchase" and the eMerchant will begin to process the transaction. The processing begins with the eMerchant communicating with the card issuing bank to verify that the user has sufficient funds to make the purchase and checking to verify the user entering the card information is the actual card owner. The card-issuing bank receives the inquiry from the eMerchant and contacts the TB server to authenticate the user. The TB server then opens a pop-up window on the users PC asking him to verify that he really wants to make this purchase and requests for him to enter his username and password. Once authenticated, the TB server notifies the card-issuing bank that the user has approved the transaction and that he is the actual owner of the card. The card-issuing bank then notifies the eMerchant that the user has sufficient funds, and that he has been authenticated as the actual card owner. The eMerchant then notifies the user that his purchase has been approved and is given an order number as a receipt. This completes the transaction in real time. The user will be disconnected from the TB server the moment he closes his web browser.

Publishing and Subscription

An online newspaper depends on advertising and subscription revenues. Digital fingerprints can allow this site to use basic registration information that is in a digital fingerprint—country, zip code, age and gender—to understand the profile of its visitor population, thereby increasing the value of the advertisement placement and the amount that can be charged for the advertisement.

The site can use the universal log-in feature of digital fingerprints for identifying its site subscribers. Site visitors no longer need to remember unique log-in names and passwords for the site, and the site no longer needs to maintain a costly log-in and password database. By understanding the profile of its first-time customers, and providing tailored information based on the basic registration information in a digital fingerprint, the site can use digital fingerprints to help it acquire new customers.

Services

A service company, such as a delivery company, can use digital fingerprints to provide secure access to its Web site. Digital fingerprints can allow this site to provide a highly customized experience to its visitors, for example, by providing specific delivery rates based on the geographic location of the customer.

Business-to-Business

With the level of authentication provided by digital fingerprints, a manufacturing company can allow portions of its Internet site to be updated by its business partners and accessed by its customers. The manufacturing company's suppliers can update their product availability and scheduled shipping date in the manufacturer's database, providing a more efficient means for inventory management. Additionally customers can track order status through the same online database. These types of transactions would not be possible on the public Internet without the use of digital fingerprints to authenticate the identity of the company's suppliers and customers.

Music, Picture, Video, or e-Book File Sale and Download

Another possible application for the unique hardware fingerprint is to use it as a lock and key for preventing unauthorized downloading. copying and playback of content files. such as MP3 music files, e-book files, graphic files, etc. The fingerprint could be associated with the downloaded file and attempting to open the file on a machine which does not bear the fingerprint results in the file being permanently locked, unusable or somehow otherwise disabled The fingerprint coding can determine whether the downloaded file can be copied to and played on a limited number of secondary machines. In fact, the encoding could initially be used to determine that the person downloading the file is the person even entitled to do so.

Cell Phone Commerce

In many areas cell phones are being used to charge goods and services just like the traditional credit card. This makes the cell phones very convenient but does raise some security problems. One of the problems with the use of cell phones is their memory. Most phones that are currently in use today display the most recent numbers inputted into the phone. These numbers may be as innocent as a telephone number but can also include account numbers and passwords. In addition, there are unscrupulous persons who can clone cell phone numbers when a user is in the vicinity. The present invention may also be used to perform secure transactions with a cell phone and avoid these security issues. A user of the present invention can add a cellular phone to the system. The system can be used to ascertain whether the person on the cellular phone is an authorized user. In this embodiment, the user connects to a merchant in order to make a purchase. The server sends an SMS message to the cell phone user that will ask the user to complete the message with the appropriate code. Both the illegal clone and the user's phone will receive the request for the code. The user knowing that he did not seek to make a purchase can respond with an appropriate message to terminate the purchase.

Alternatively, a fingerprint of the cell phone that is being added to the system is created. When a purchase is being made, the vendor sends the SMS message and the user must respond the code that has been entered. The vendor's server checks the code for accuracy and the fingerprint as well and if appropriate, sends to the cell phone user a one time password. The one time password combined with the user's pin number acts as a signature for the purchase of goods or services using the cell phone.

Pay-Per-View Television

The present invention also has applicability in the field of television. Currently many cable companies and satellite television providers are using "Smart Card" type technology to restrict the viewer to programs and/or services that have been paid for. The user purchases a Smart Card from the service provider and inserts the card into the descrambler at home. As the cost of cable and satellite television programs increases there is a need to prevent users of cable systems and satellite television services from using the television set top box with more than one television and to prevent the user from loaning or giving the descrambler and smart card to a friend or relative for their use. The present invention permits the fingerprint of the television set to be ascertained and will cause the descrambler to be inoperative if the user does not have the proper television connected to the descrambler.

It will be appreciated by those skilled in the art that the present invention can be used with any number of different devices to prevent unauthorized use.

The examples discussed herein and demonstrated by the Figures are merely for illustrative purposes only. Variations and modifications of the disclosed invention in a manner well within the skill of the man of average skill in the art are contemplated and are intended to be encompassed within the scope and spirit of the invention as defined by the claims which follow.

Figure 7:
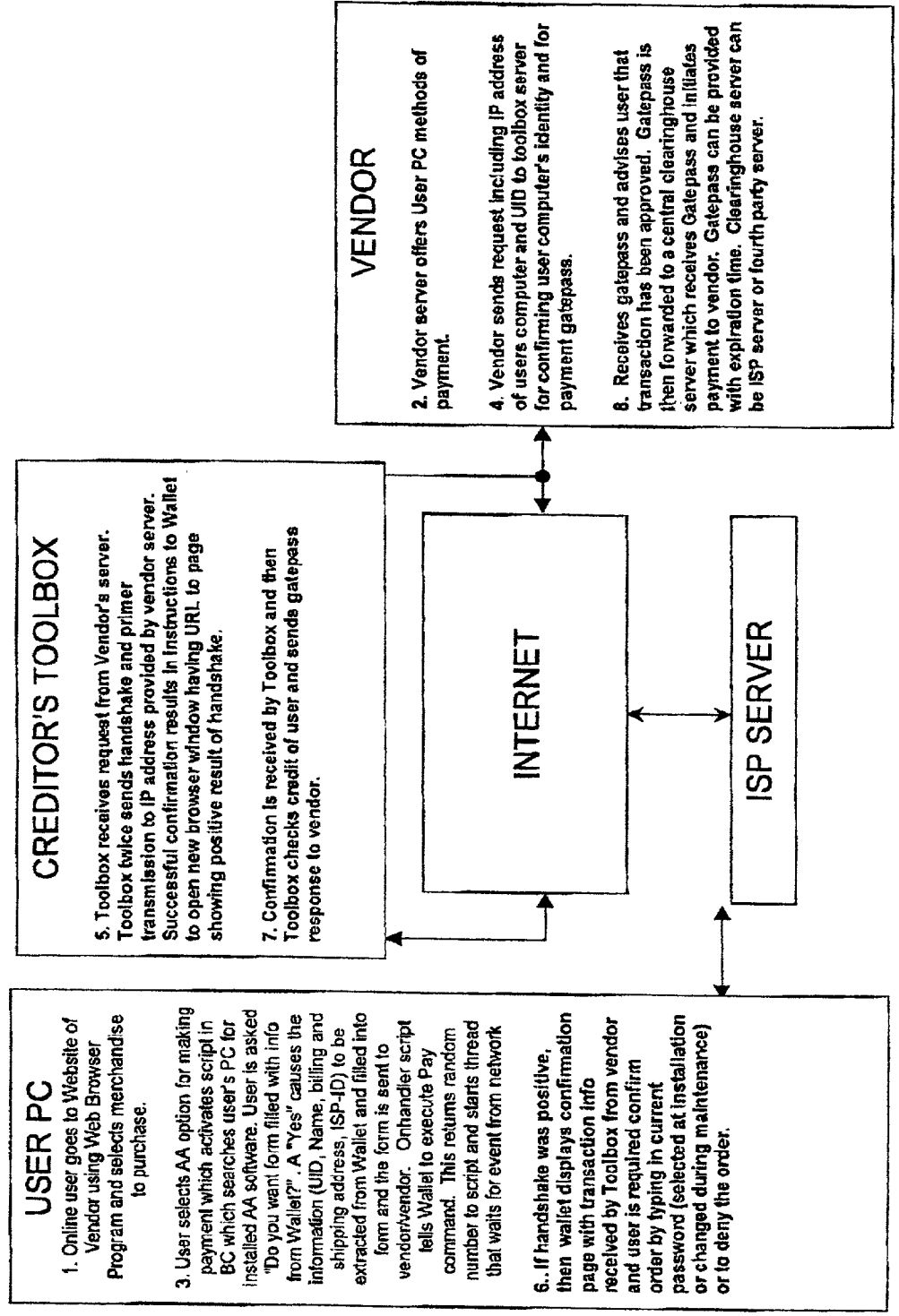
FIG. 7 shows a block diagram illustrating another exemplary embodiment of the present invention.
Figure 8:
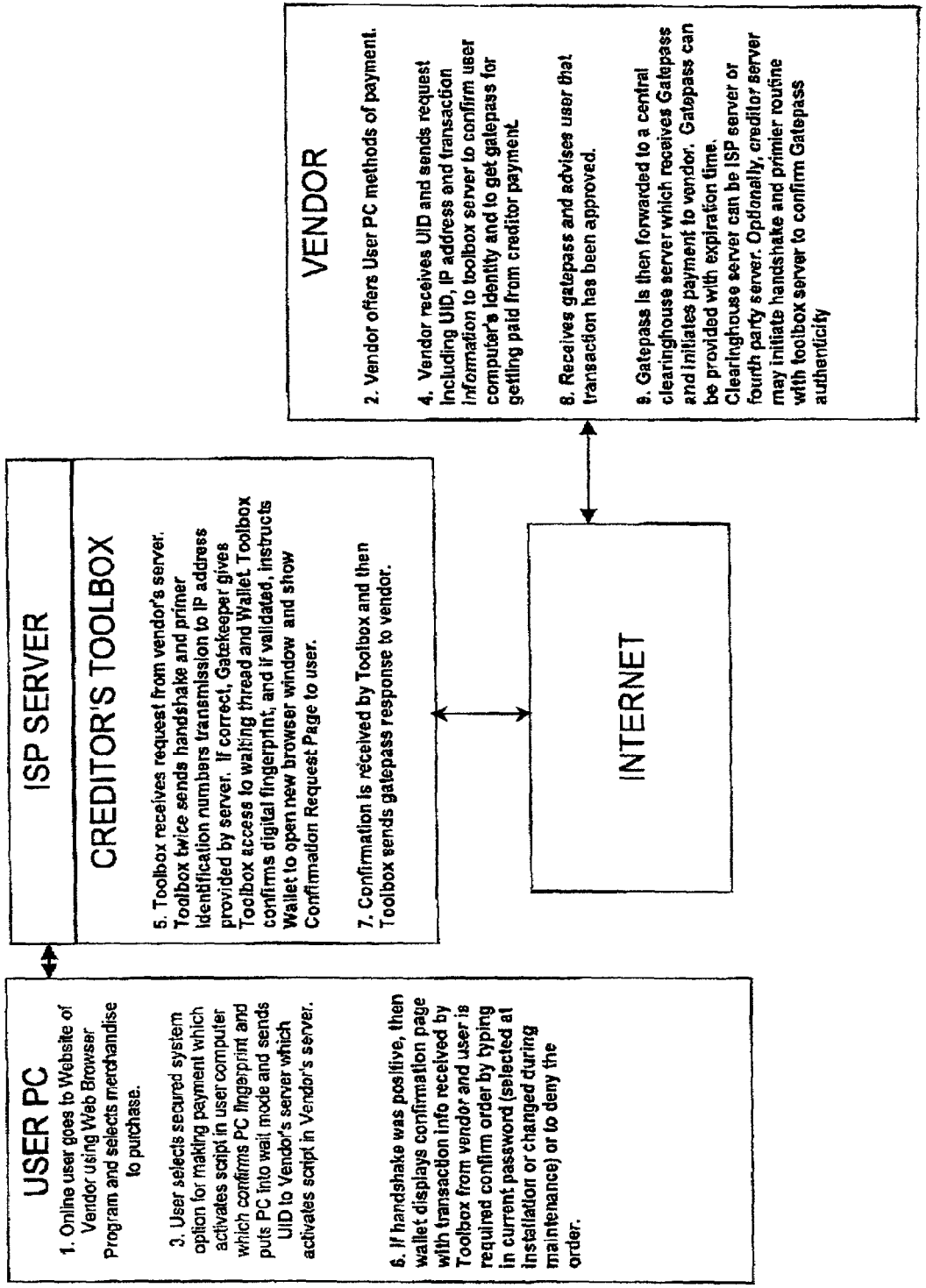
FIG. 8 shows a block diagram illustrating another exemplary embodiment of the present invention.
Figure 9:
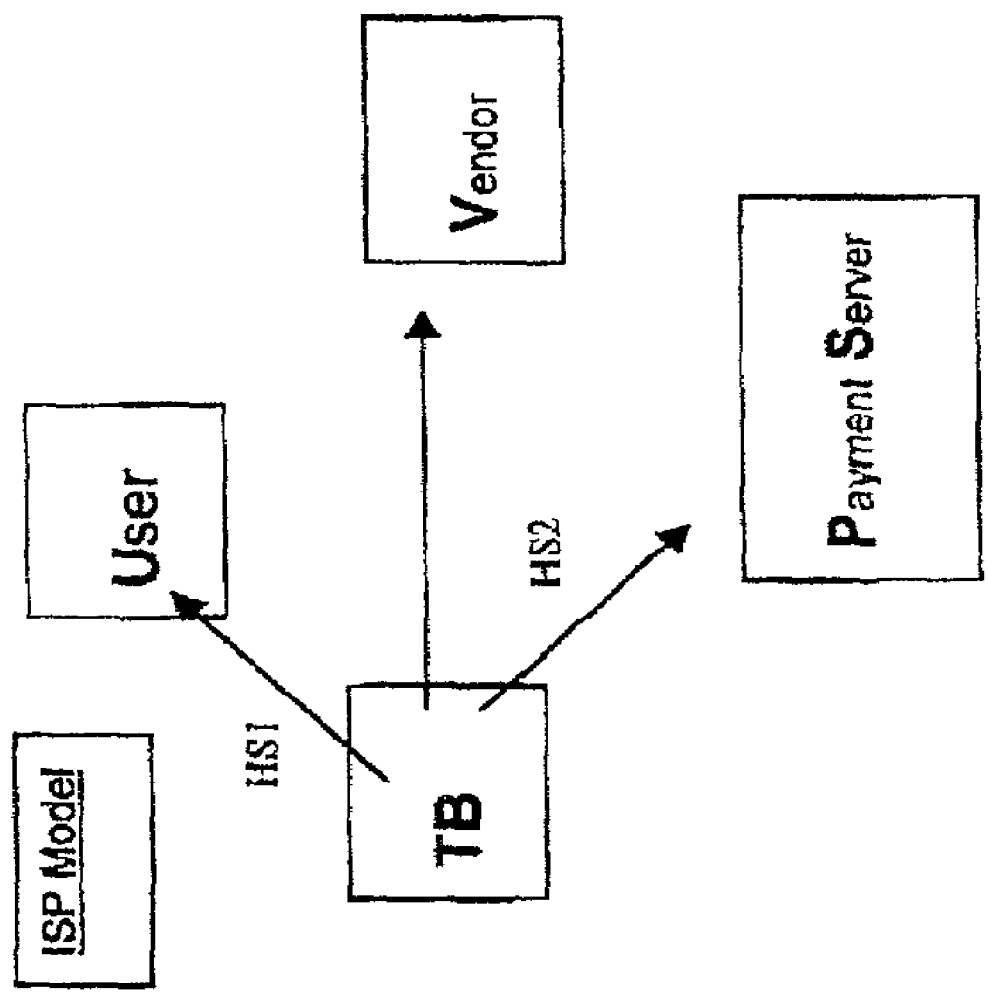
FIG. 9 shows a block diagram illustrating the handshake and priming process of the system of the present invention.

For example, in another exemplary embodiment the ISP is not the site where the Toolbox resides. With reference to FIG. 7, The Toolbox could be physically located at the site of the credit provider ("Creditor"), e.g. online-enabled bank, credit card provider or other affinity-card or charge account provider (including brick-and-mortar retailers with an online presence such as Macy's) and in communication through normal channels with Creditors transactional server. In this case, the ISP would not be an active part of the purchase transaction, other than in the usual known way by giving User access to the Internet. Generally, except as specified below, the rest of the process proceeds substantially as described below. Specifically, in this exemplary embodiment, the account is set up as follows:

Installation Process

1) A user requests to join the system, which could for, example be, via an ASP page on a web server, over an HTTPS connection.

2) The applicant receives an account ID, and his application information is stored in an applicant's database on an application and database server, behind a firewall. The system owner, which can be an ISP, bank or other financial provider accesses this database from another web page, located on a Web server behind a firewall on an internal LAN.

3) When the system owner approves the user's application, the system automatically sends the user an email containing a link to a unique URL where he can begin the registration process. It also generates a one-time activation key linked to the user's account. The system owner must give this one-time activation key to the user in a secure way (for example, in person, or via a printout from his automatic teller). Possession of the one-time activation key constitutes proof that the user is who he purports to be during the activation stage.

4) When the user goes to the URL, and presses the "Activate" button, the activation process begins by downloading a DLL containing a COM object to his computer. Dynamic Link Library (DLL) refers to the ability in Windows and OS/2 for executable memory to call software libraries (i.e., subroutines, or code for accomplishing specific functions) not previously linked to the executable. The executable is compiled with a library of "stubs" which allow link errors to be detected at compile-time. Then, at run-time, either the system loader or the task's entry code must arrange for library calls to be patched with the addresses of the real shared library routines, possibly via a lump table.

5) This COM object relays the user's account ID (which it knows because he has been directed to a unique URL) to a "listener." This listener contains a proprietary communication protocol to enable the authentication web servers in the DMZ to communicate securely with the authentication application server and database server behind the firewall. The listener asks the applicant database behind the firewall to validate that the machine ID it has been given is legal, and not yet activated. If so, the listener tells the COM object to send a pop-up to the user, to collect the one-time activation key. If not, the activation process stops. De-Militarized Zone (DMZ) is from the military term for an area between two opponents, where fighting is prevented. DMZ Ethernets connect networks and computers controlled by different bodies. External DMZ Ethernets link regional networks with routers to internal networks. Internal DMZ Ethernets link local nodes with routers to the regional networks.

6) If the key collected by the popup matches what is stored in the database for the user's account, the DLL proceeds to collect the user's hardware signature and sends them back to the data base. This hardware signature contains parameters including but not limited to CPU, hard disk and other hardware elements which may contain burnt in manufacturer's serial numbers or identifiers which can not be duplicated in any other machine or other distinguishing characteristics such as RAM, hard drive size, installed software, etc. If the key does not match, or the user does not answer within a set time limit, the activation process stops. After a set number of failed tries, the user's account is disabled.

7) If the key matched, the DLL then returns a seed for an encrypted one-time password (OTP) for use during the next encounter. Another pop-up is sent to collect a personal password chosen by the user, which is known only to the user, and not stored anywhere.

8) After the personal password has been collected, a configuration file containing, among other things, the OTP, which has just been exchanged, is encrypted. The account is then marked as active. On the next encounter, the one-time password just exchanged will be used as part of the authentication process. The key to opening the configuration file is the user's personal password together with parts of his computer's hardware.

Once the installation has been completed, the software components remaining on the home user's computer are the configuration file and the DLL containing the COM object. The COM object contains a self-validation routine, which lets it make sure that it has not been tampered with when it is loaded into memory, and a routine to establish a secure communication channel after it has made sure that it is intact. The secure communication channel is used to call a dynamically generated DLL from the server. In all future encounters, this dynamically generated DLL does most of the work in collecting information for the authentication process. The other components of the COM object are a locator, a profile manager and a payment method manager.

The locator ensures that the latest version of the software is installed, and locates the profile manager and the payment method manager for a home user. The locator has two interfaces implemented via the agentclassld property and the agentCodeBase property. AgentClassld specifies which payment method manager and which profile manager to use. AgentCodeBase specifies which server holds the most updated version of the software, and compares what is installed to latest version. If the latest version is not installed, AgentCodeBase installs it automatically. This enables us to control what information is supplied to vendors while allowing vendors to code one standard line of code that never changes.

AgentClassld has five methods: get attribute, set attribute, set parameter, stop payment, and pay. Get attribute is a method to get non-sensitive information such as name, shipping information, etc.

Set attribute helps a browser page put this information into the user's computer. Set parameter helps configure the profile.

Stop payment lets the user stop in the middle of a transaction, once the pay method has been invoked.

Pay is responsible for establishing a secure communications channel, and returning the buyer's hardware signature and password on that channel.

The Payment Method Manager enables the choice of more than one payment option.

The profile manager allows different people to use the same hardware. One account may have multiple users, with multiple shipping addresses or billing addresses. A user may also choose to use billing information from a previously existing wallet such as Microsoft wallet, via the profile manager.

Transaction Cycle

Step 1—Customer Starts the Login Process at a Bank or Vendor

The first step occurs when the customer contacts a bank or vendor with vendor script installed and attempts to log in. This activates script, which was copied and pasted into the bank or vendor's e-commerce application.

Step 2—The Customer Contacts the TB

The script activates code, which contacts the DLL installed with the buyer's home software, and tries to load the COM object into memory. When the COM object is loaded into memory it runs an integrity test to make sure that it has not been tampered with. If the checksum is correct, it leaves the result in memory, so it can pass it later to the authentication server. Otherwise, it returns an error that disables the user's account and stops working.

If the COM object succeeds in verifying that it is intact, Pay attempts to contact a "listener" on the TB and establish a secure TCP/IP communication channel. Using RSA encryption, a shared secret key is now exchanged using a Diffie-Helman key exchange on this channel, and the encryption method switches to triple-DES. (In triple DES encryption, the encryption keys change several times during the transmission.)

The COM object then contacts the TB using the TB's public RSA key, passing to it the users account and machine IDs. The listener sends a request to validate the customer's account number and machine ID number to the application database, where the user's installation parameters are recorded. If they are valid, the listener then asks the COM object for an encrypted one-time password. This password is generated from a seed that was stored in a configuration file on the user's computer and in the TB's user database during the last exchange between them. This one-time password is "unlocked" for use by the user's personal password, known only to him, and stored only in his mind, and by the CPU Id of his computer (When the transaction is an installation, and there has been no prior exchange, a first time activation key received from the owner system takes the place the place of the one-time password.)

If the numbers do not match, or if the user does not answer within a set time limit, the home user software sends back an error message, the account is temporarily disabled, and a log is created.

If the numbers match, the COM object knows that it is talking to the TB, since only the TB can decrypt messages sent with its public key, and the TB knows that it is talking to the right person since only he can "unlock" the one-time password.

Step 3—The TB Authenticates the Customer

Now that a secure channel exits, the listener on the TB sends a dynamically generated DLL to collect the home user's hardware signature information. This DLL is unique to each transaction. It returns signature in a string which is uniquely scrambled for each transaction and encrypted.

If all of the parameters match, the TB's authentication server can be sure it is talking to the correct customer, who is communicating from the correct computer. The TB returns a valid transaction ID to the customer, who passes it to the bank or vendor. In the bank model, the thread is closed, and an object on the server waits for the bank to inquire about the transaction. In the ISP or e-commerce model, the thread remains open, waiting for an order to issue a pop-up window to the user to validate purchase details for the transaction.

Step 4—The Bank or Vendor Contacts the TB to Verify the Transaction

Bank or Pure Authentication Model

The bank or other vendor passes customers account ID, machine ID, Listener ID, Provider ID and transaction ID to the TB. If these match what was stored in the database when the customer was authenticated, in the pure authentication model, the process ends here. A log-in transaction is validated and the customer continues on to carry out his transactions using the owners proprietary system, whatever that may be. Optionally, the TB may send the customer an SMS message notifying him of the transaction ISP or E-commerce Models In the ISP and other E-commerce models. payment details and credit availability must be validated in addition to user identity. In addition to the customer's account ID, machine ID, Listener ID, provider ID and transaction ID mentioned above, the Vendor passes the payment details (invoice number, invoice amount, currency) to the TB's authentication server. A new pop-up window is sent to the user on the secure channel previously established by Pay, asking him to authorize the invoice details. (As noted above, if the user does not answer within the set period of time, or rejects the transaction, the process is stopped and the thread dies). If the user accepts the transaction by clicking on the "Accept' button. TB's authentication server contacts a Payment server, and verifies that the user has credit available. If so, a transaction debiting the user and crediting the vendor is issued to the customer's chosen financial provider. Lastly, the TB notifies the vendor that the transaction is valid and the customer that a successful transaction has been completed. Optionally, the TB may send the customer an SMS message notifying him of the transaction.

With reference to FIG. 7, it can be seen that a typical purchasing session in this exemplary embodiment proceeds as follows:
 a) User PC goes online and user points his browser to the Website of a Vendor server using any Web Browser Program; downloads files depicting merchandise for sale and selects merchandise to purchase which generates a purchase request to Vendor's server, all in a manner well known in the art.
b) Vendors server sends back to user PC an order page or pages which typically includes a transaction number, the value of the order, and asks for billing information, shipping information At some point, user is offered to indicate her desired method of payment and selects option button which designates the AA payment plan of the present invention, e.g "AA OPTION".
c) Selection of the "AA Option" generates a message back to Vendor's server which instructs the Vendor's server to forward a request to the Creditor's Toolbox to confirm that the user is (a) actually and actively online and trying to make this purchase, and (b) that the user has the necessary credit to make such a purchase.
a) Upon receipt of the request from Vendor's server, Toolbox immediately sends a transmission to the IP address provided by Vendor's server. The transmission includes files which (a) search for, decrypt and read the UID files in user's PC to see who it is, (if the PC is a machine registered in the system) and (b) which generate a Pop-up message on the registered user's browser to make sure that the transaction is desired by the AA system registered user. The message advises that a transaction having a particular value is being requested and asks for confirmation or rejection of the transaction. To reject the transaction, user can actively Reject by pressing a Reject button or simply by not responding within a predetermined default time. To accept the transaction, the user must provide his user password and submit the form back to the Toolbox. The form is accompanied transparently by the fingerprint file containing the AID and other machine identifying information decrypted and extracted from user's PC by the transmission from the Toolbox.
  a) If accepted by user, then Toolbox checks database to make sure user's credit limit is not exceeded and sends a coded confirmation to Vendor's server that the transaction is confirmed and will be paid for by Creditor on behalf of user. Vendor then sends HTML message to advise user that the identified transaction has been successfully processed.

As described above, if user either actively Rejects or fails to respond to the Pop-up message in a predetermined time period, for example, 2 minutes, the Pop-up message disappears and Toolbox advises Vendor's server that the transaction is not accepted. Optionally, provision can be made where user can label a tendered transaction as "suspicious" and reject an order with prejudice, thus alerting both Toolbox and Security Program Manager, and therefore Vendor, that some attempt was made to defraud Vendor. Obviously, this knowledge can provide great benefits in aiding to track down cyber credit frauds and inhibit criminal activity.

In yet another exemplary embodiment, the Creditor server is also an ISP server, or at least they are at the same location and being serviced by the same modem basket. The Toolbox is still situated at that location as well. Thus, a bank which offers ISP services to it's on-line customers can also offer them the safety of the AA transaction system and method, which is carried out by the Toolbox right on the bank's/ISP's premises. The transaction continues as follows in the embodiment wherein the Toolbox is located at the ISP, hereinafter the ISP-Toolbox Model.

As was mentioned herein above, TB receives the encrypted password from the wallet if user accepted. TB can further have the ISP server verify that the session is still alive during the course of the transaction. This will validate the continued authenticity of the user. TB uses the encrypted password to change mark on transaction record from "not yet confirmed" to "Confirmed". The transaction record was assigned a unique ID number (UTID) which also serves as the Gatepost number and which is now sent to the vendor server, Vendor server receives the Gatepost number and forwards it to creditor or payment server ("PS"), together with the amount to be paid and a vendor-assigned purchase transaction number.

For extra security, it is preferable that PS confirm the Gatepost with TB using the double handshake and priming routine with TB, similar to that performed between TB and users client PC. PS would check with the TB to verify that the session is still alive when TB responds, PS sends Gatepost received from Vendor together with transaction information. Optionally, when PS is registered as a participant in the security program, similar software agents and wallets could be installed on the PS so that TB can confirm PS identity after the handshake process using hardware fingerprints.

TB checks TB server database and if Gatepass and transaction information match the transaction record, then TB sends response to PS indicating that user has confirmed the desire to close the transaction and PS is authorized to charge User's account for the order. TB records on the transaction record that the payment request has been tendered and approved.

Physical Placement of TB in one exemplary embodiment, the TB is located at the physical site of the ISP, optimally connected to the phone or communication lines coming into the ISP server directly from users on one side of ISP server The TB is also connected to lines going out to the Internet (via the modem basket) from the ISP server. The TB does not interact directly with the ISP server. For the most part, it monitors incoming and outgoing traffic, waiting to take over those communications should a security related transaction be called for by a home user.

The following scenario describes an exemplary embodiment of the process initiated when a request for a security related transaction is detected by the TB located at the ISP. As will be further described below, in another exemplary embodiment, the Toolbox might not be located at the ISP but at the site of another credit provider.
  a) User directs his browser to the URL of a vendor server and selects merchandise to purchase.
  b) User is offered methods of payment and selects option button for "SECURITY PROGRAM MANAGER" or "AA PAY OPTION".
  c) In an Autofetch process, an OnChange script handler in User's software prepares and sends request to central system administrator server for Session User Identity.
  d) Central system administrator server redirects request to user's TB equipped ISP.
  e) TB searches its files and returns user's identity
  f) A user form is generated by user's computer and populated with user information including identity returned in step (e) from ISP TB.
  g) The form is submitted, together with a challenge which is forwarded to the vendor server.
  h) Vendor server runs a script that calls the central system administrator server's getGatePass.asp, thereby transmitting the Session User Identity.
  i) The central system administrator server redirects the vendor server's call to the ISP.
  j) The TB at the ISP receives the getGatePass.asp and runs a check of the user's authenticity as part of the vendor server's call to make the sure that is where the user really is logged in. If the authenticity fails, the vendor server receives a rejection notification from the ISP server and the transaction is terminated.

k) If the IP test succeeds (i.e. the user really is who they claim to be) then the ISP challenges the home listener.

Figure 10:
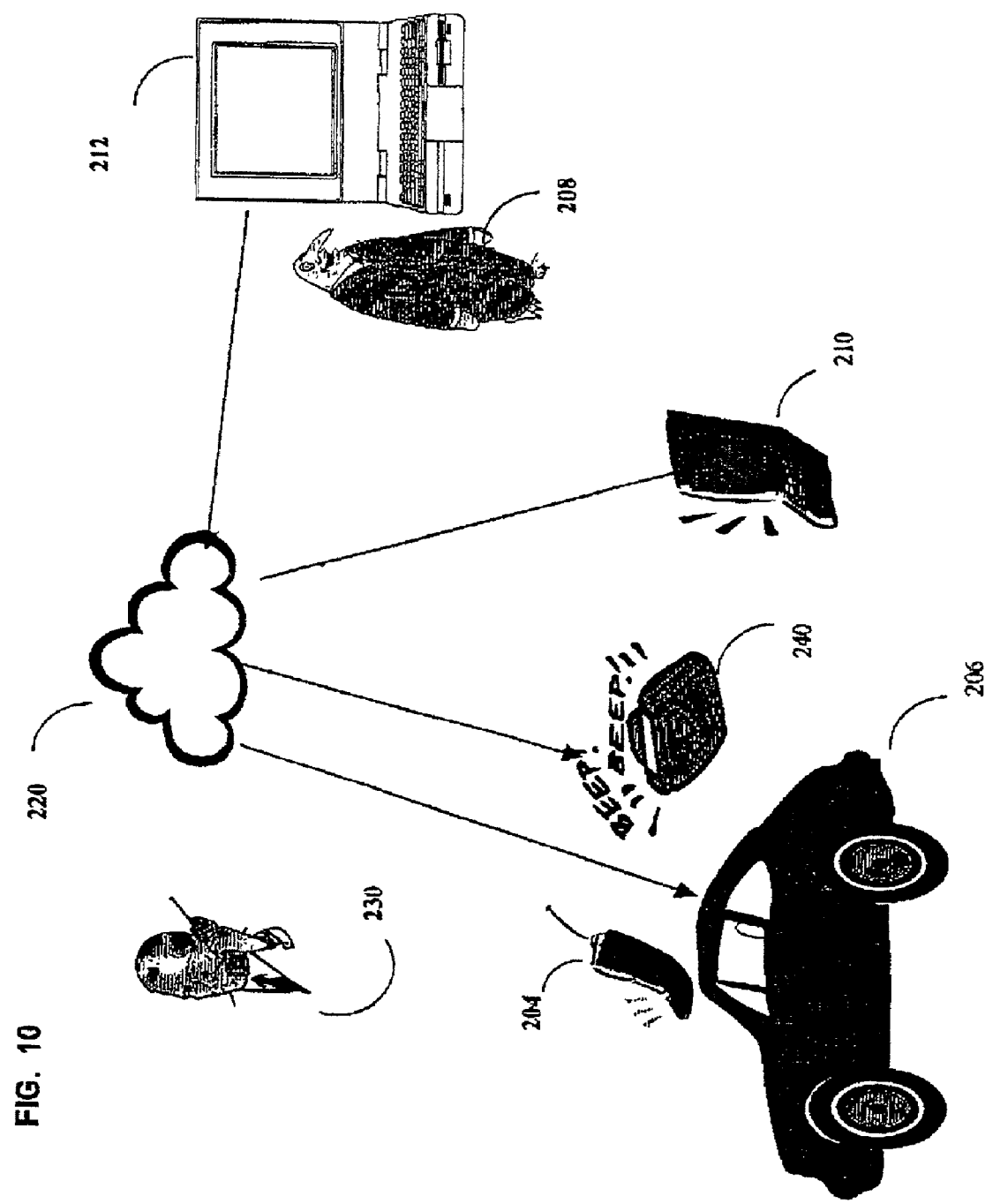
FIG. 10 shows a user reacting remotely to fraudulent use of his PC.

FIG. 10 illustrates a situation where client 204 is located remotely from his PC 212, for example driving his car 206. An intruder 208 has gained access to his PC 212, and has fraudulently attempted a secure transaction. The AA communicates a message accordingly to client 204 via the Internet 220. The client can be remotely contacted, for example, through his cell phone 230, his pager 240 or his PDA 210. Client 204 is shown receiving the message through his cell phone 230

Figure 11:
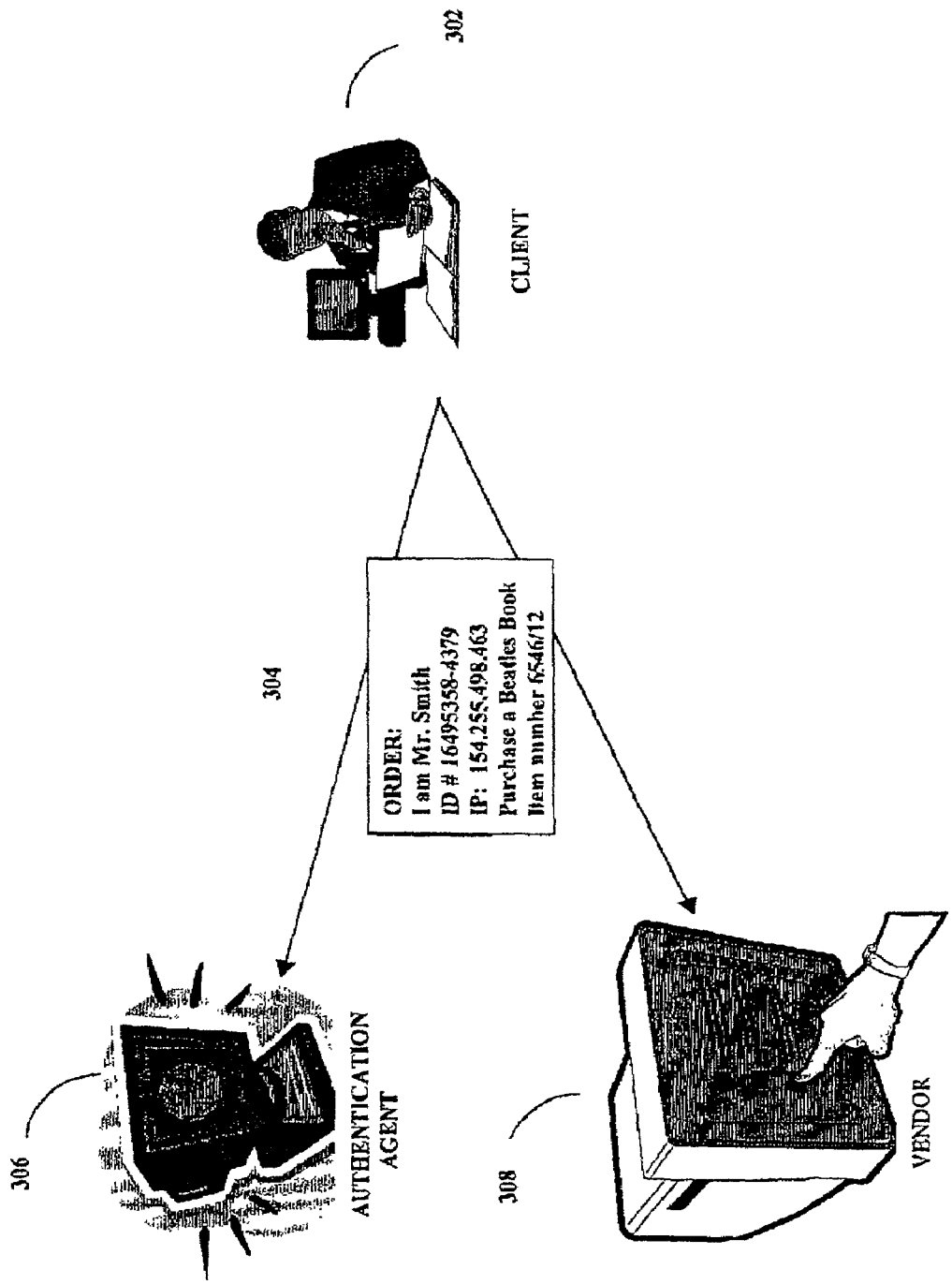
FIG. 11 shows a user computer in simultaneous communication with a vendor computer and the AA computer, wherein user computer is Initiating a purchase transaction.
Figure 12:
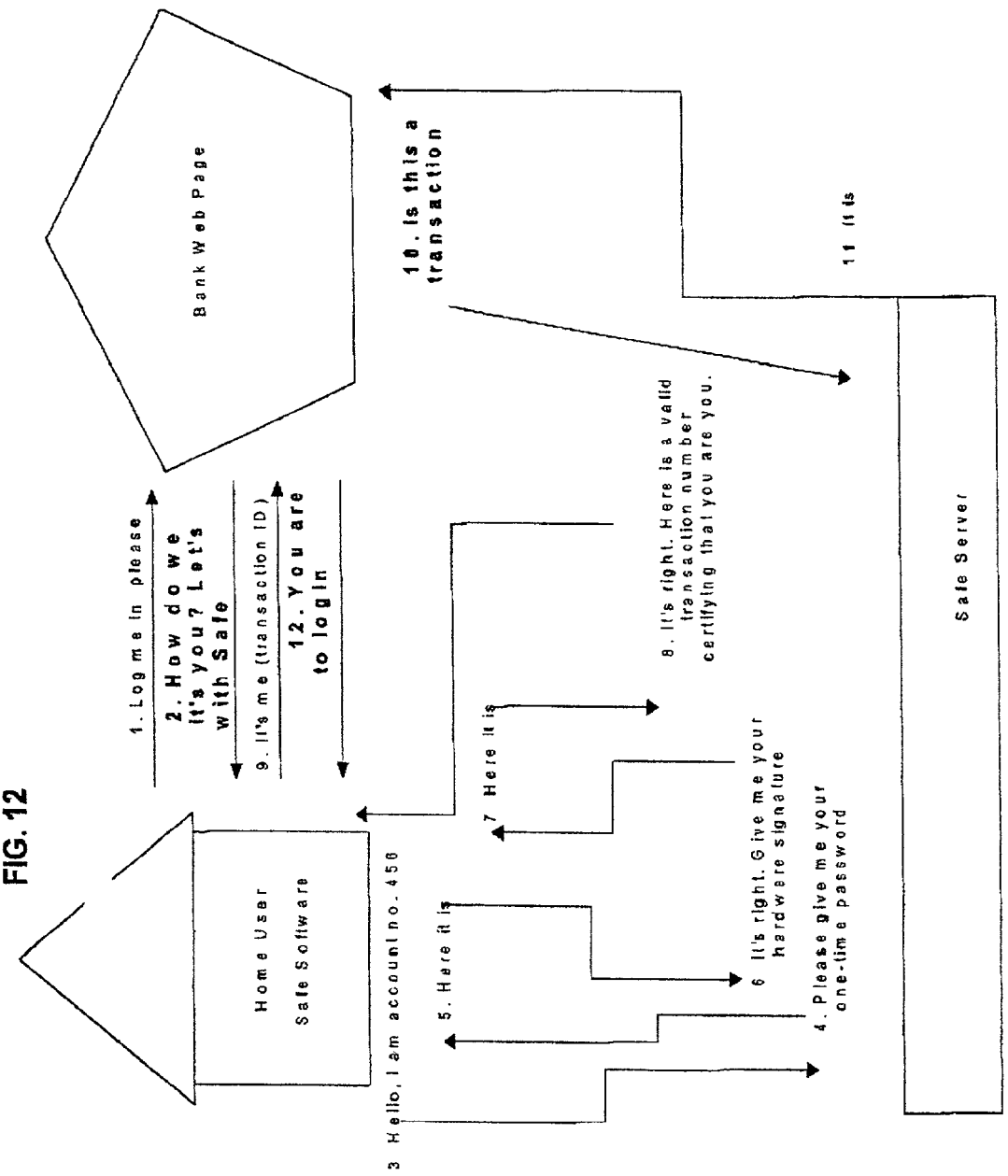
FIG. 12 shows a block diagram illustrating another exemplary embodiment of the present invention.

FIG. 11 illustrates client 302 sending a simultaneous message 304 to AA 306 and vendor 308.

The fingerprint mechanism of the present invention can be adapted for use to ensure ownership rights in downloaded copyrighted material, such as content files which includes MP3 music files, e-books, graphic files, and the like. In the event a content file is to be purchased by a user, for example, if a user orders an MP3 file, the user is directed to a URL address for downloading the file The digital fingerprint provided by the smart DLL in the user's PC is incorporated into code in the content file itself. Thus, the file is only downloadable if the fingerprint information encoded into the file matches that of the user's PC. Additionally, the content file can be encoded to limit how and where the downloaded file can be accessed and operated. The encoding can determine whether or not the file can be transferred to a limited number of other PC. Alternatively, the ID is associated with a diskette, as described herein above, and may be transferred to a limited number of PC's or perhaps only to one other MP3 player (or PDAs in the case of an e-book).

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description, and which are not disclosed in the prior art.

What is claimed is:

1. A method for performing secure electronic transactions on a computer network, said computer network comprising a user's computer, a vendor server, a creditor server and a toolbox server, said user's computer having a gatekeeper and digital fingerprint stored therein, including;
   said user's computer sending a purchase request to said vendor server to pay for a purchase, which purchase request includes a user identification number associated with said user's computer and known to said toolbox server, said purchase request initiating the transmission of a confirmation request from said vendor server to said toolbox server to confirm an identity of said user's computer;
   said confirmation request causing said toolbox server to send a pre-arranged handshake and primer to said gatekeeper, whereupon said gatekeeper allows said toolbox server to request confirmation of said digital fingerprint, wherein said primer comprises another pre-arranged handshake for a next succeeding occurrence of a transaction confirmation operation.

2. A method in accordance with claim 1, wherein said digital fingerprint is internally confirmed by said user's computer when said purchase request is initiated.

3. A method in accordance with claim 1, wherein said purchase request is sent to said vendor substantially simultaneously with said confirmation request, which confirmation request is sent directly from said user's computer to said toolbox server.

4. A system for copy-protecting content files downloadable from a computer network, said computer network including a user's computer with a gatekeeper, a vendors server, and a toolbox, wherein said user's computer has received fingerprint programming from said toolbox for creating a digital fingerprint for use by said toolbox to identify said user's computer, and further comprising said vendor server configured to encode said digital fingerprint into said content files, wherein said downloaded files will only be downloadable by said user, wherein said downloaded files can only be copied a limited number of times directly from said user's computer onto other secondary devices, said limited number being determined by said digital fingerprint encoding, wherein said toolbox configured to send a pre-arranged handshake and primer to said gatekeeper, wherein said gatekeeper is configured to allow confirmation of said digital fingerprint, and wherein said primer comprises another pre-arranged handshake for a next succeeding occurrence of a transaction confirmation operation.

5. A system for permitting a secure electronic purchase transaction on a public computer network, said network comprising a user's computer, a vendor's server, and further comprising a means for providing verification of user's identity, said user's computer having a gatekeeper and digital fingerprint stored therein, wherein in response to a request by said vendor's server said means for providing verification positively identifies user's computer, requests a confirmation from said user's computer of said transaction, and upon receiving said confirmation, provides vendor's server with a means for receiving payment, wherein said confirmation request is contemporaneously sent to a cellular device, wherein said requesting of said confirmation from said user's computer includes sending a pre-arranged handshake and primer to said gatekeeper, wherein said gatekeeper allows requesting confirmation of said digital fingerprint, wherein said primer comprises another pre-arranged handshake for a next succeeding occurrence of a transaction confirmation operation.

6. A system for performing secure electronic transactions on a computer network, said system comprising a user's computer, a vendor server, a creditor server and a toolbox server, said user's computer having a gatekeeper and digital fingerprint stored therein, and wherein when said user's computer sends a purchase request to said vendor server to pay for a purchase, said purchase request includes a user identification number associated with said user's computer and known to said toolbox server, said purchase request to initiate the transmission of a confirmation request from said vendor server to said toolbox server to confirm an identity of said user's computer; and wherein said confirmation request causes said toolbox server to send a pre-arranged handshake and primer to said gatekeeper, whereupon said gatekeeper allows said toolbox server to request confirmation of said digital fingerprint, wherein said primer comprises another pre-arranged handshake for a next succeeding occurrence of a transaction confirmation operation.

7. A system in accordance with claim 6, wherein said digital fingerprint is internally confirmed by said user's computer when said purchase request is initiated.

8. A system in accordance with claim 6, wherein said users purchase request is sent to said vendor when said confirmation request is sent from said user computer to said toolbox server.

9. A system for permitting a secure electronic transaction on a network, said network comprising a user device having a digital fingerprint and a gatekeeper, a provider's server and further comprising a means for providing verification of user's identity, wherein in response to a request by said provider's server said means for providing verification positively identifies the fingerprint of the user device, requests a confirmation from said user device of said transaction, and upon receipt of said confirmation, completes the transaction, wherein the network is a public network, and wherein the user device is a digital set top box connected to a television, wherein said requesting said confirmation from said user device of said transaction includes sending a pre-arranged handshake and primer to said gatekeeper, wherein said gatekeeper allows requesting confirmation of said digital fingerprint, and wherein said primer comprises another pre-arranged handshake for a next succeeding occurrence of a transaction confirmation operation.

10. A system for permitting a secure electronic transaction on a network, said network comprising a user device having a digital fingerprint and a gatekeeper, a provider's server and further comprising a means for providing verification of user's identity, wherein in response to a request by said provider's server, said means for providing verification positively identifies the fingerprint of the user device, requests a confirmation from said user device of said transaction and upon receiving said confirmation completes the transaction, wherein said fingerprint provides an electronic signature that can be used to identify a user, wherein said requesting said confirmation from said user device of said transaction includes sending a pre-arranged handshake and primer to said gatekeeper, wherein said gatekeeper allows requesting confirmation of said digital fingerprint, wherein said primer comprises another pre-arranged handshake for a next succeeding occurrence of a transaction confirmation operation.

11. A computer-readable medium including instructions for performing secure electronic transactions on a computer network, said computer network comprising a user's computer, a vendor server, a creditor server and a toolbox server, said user's computer having a gatekeeper and digital fingerprint stored therein, the instructions, when executed by a computer, cause the computer to perform operations comprising:
    said user's computer sending a purchase request to said vendor server to pay for a purchase, which purchase request includes a user identification number associated with said user's computer and known to said toolbox server, said purchase request initiating the transmission of a confirmation request from said vendor server to said toolbox server to confirm an identity of said user's computer;
    said confirmation request causing said toolbox server to send a pre-arranged handshake and primer to said gatekeeper, wherein said gatekeeper allows said toolbox server to request confirmation of said digital fingerprint, and wherein said primer comprises another pre-arranged handshake for a next succeeding occurrence of a transaction confirmation operation.

\* \* \* \* \*

UNITED STATES PATENT AND TRADEMARK OFFICE
CERTIFICATE OF CORRECTION

PATENT NO. : 7,366,702 B2
APPLICATION NO. : 09/875795
DATED : April 29, 2008
INVENTOR(S) : David It is certified that error appears in the above-identified patent and that said Letters Patent is hereby corrected as shown below:

On the Title Page, Item 56 on page 2, under "Foreign Patent Documents", lines 2-3, after "WO WO98/47116 10/1998"
delete "WO WO-98/47116 10/1998
WO WO-98/59455 12/1998".

On the Title Page, Item 56 on page 2, under "Foreign Patent Documents", line 5, above "WO WO99/31610 6/1999" delete "WO WO-99/31610 6/1999".

On the Title Page, Item 56 on page 2, under "Other Publications", line 1, delete "Scientic" and insert -- Scientific --, therefor.

On the Title Page, Item 56 on page 2, under "Other Publications", line 3, delete "Authentification" and insert -- Authentication --, therefor.

On the Title Page, Item 56 on page 2, under "Other Publications", line 13, delete "Authentification" and insert -- Authentication --, therefor.

On the Title Page, Item 56 on page 2, under "Other Publications", line 27, delete "Delivererd" and insert -- Delivered --, therefor.

On the Title Page, Item 56 on page 2, under "Other Publications", line 12, delete "Non-Final" and insert -- Final --, therefor.

On the Title Page, Item 56 on page 2, under "Other Publications", line 32, delete "Non-Final" and insert -- Final --, therefor.

On the Title Page, Item 56 on page 2, under "Other Publications", line 59, delete "Non-Final" and insert -- Final --, therefor.

On the Title Page, Item 56 on page 2, under "Other Publications", line 63, delete "OCt." and insert -- Oct. --, therefor.

Figure 6:
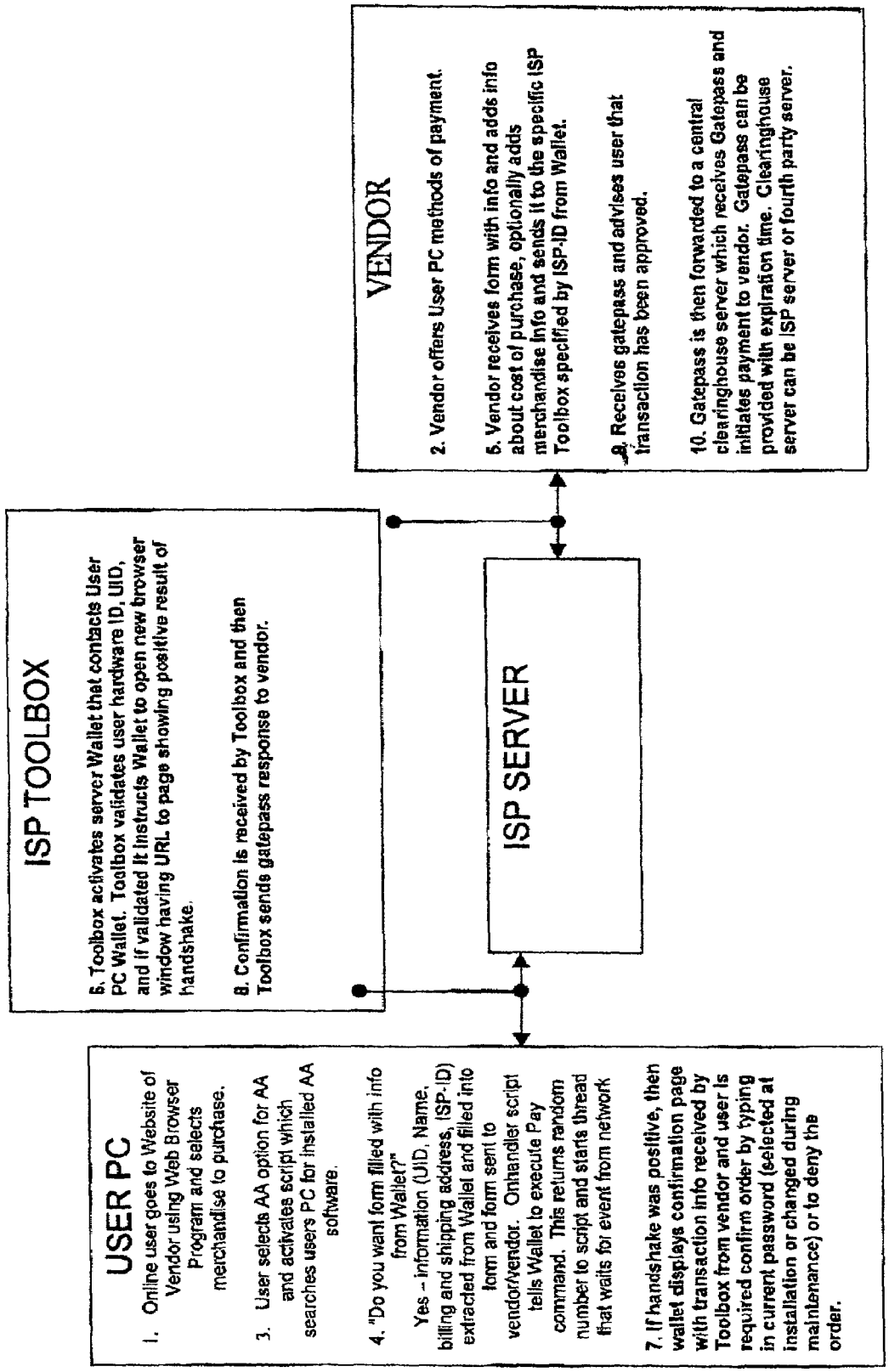
FIG. 6 shows a block diagram illustrating another exemplary embodiment of the present invention.

On Sheet 4 of 10, in Fig. 6 (Under heading USER PC), line 19, after "network" insert -- . --.

On Sheet 5 of 10, in Fig. 7 (Under heading USER PC), line 19, after "network" insert -- . --.

UNITED STATES PATENT AND TRADEMARK OFFICE
CERTIFICATE OF CORRECTION

PATENT NO.        : 7,366,702 B2
APPLICATION NO.   : 09/875795
DATED             : April 29, 2008
INVENTOR(S)       : David It is certified that error appears in the above-identified patent and that said Letters Patent is hereby corrected as shown below:

In column 1, line 66, delete "et al-," and insert -- et al., --, therefor.

In column 2, line 11, after "card" insert -- . --.

In column 6, line 65, delete "invention:" and insert -- invention; --, therefor.

In column 7, line 61, after "fingerprint" insert -- . --.

In column 8, line 13, delete "browser," and insert -- browser; --, therefor.

In column 8, line 15, delete ""TB")," and insert -- "TB"), --, therefor.

In column 10, line 63, delete "e.g" and insert -- e.g. --, therefor.

In column 10, line 65, delete "etc-)." and insert -- etc.). --, therefor.

In column 14, line 18, delete "downloading." and insert -- downloading, --, therefor.

In column 14, line 19, delete "files." and insert -- files, --, therefor.

In column 14, line 23, after "disabled" insert -- . --.

In column 15, line 23, after "FIG. 7," delete "The" and insert -- the --, therefor.

In column 15, line 40, delete "2)The" and insert -- 2) The --, therefor.

In column 15, line 48, delete "3)When" and insert -- 3) When --, therefor.

In column 16, line 3, delete "5)This" and insert -- 5) This --, therefor.

In column 16, line 63, delete "agentclassld" and insert -- agentClassld --, therefor.

In column 18, line 38, after "transaction" insert -- . --.

In column 18, line 40, delete "models." and insert -- models, --, therefor.

In column 18, line 51, delete ""Accept'" and insert -- "Accept" --, therefor.

UNITED STATES PATENT AND TRADEMARK OFFICE
CERTIFICATE OF CORRECTION

PATENT NO. : 7,366,702 B2
APPLICATION NO. : 09/875795
DATED : April 29, 2008
INVENTOR(S) : David It is certified that error appears in the above-identified patent and that said Letters Patent is hereby corrected as shown below:

In column 19, line 3, delete "Vendors" and insert -- Vendor's --, therefor.

In column 19, line 9, delete "e.g" and insert -- e.g. --, therefor.

In column 19, line 29, delete "predetermined" and insert -- pre-determined --, therefor.

In column 20, line 55, after "identity" insert -- . --.

In column 21, line 15, after "230" insert -- . --.

In column 21, line 52, in Claim 1, delete "including;" and insert -- including: --, therefor.

In column 22, line 12, in Claim 4, delete "vendors" and insert -- vendor's --, therefor.

Signed and Sealed this

Twelfth Day of August, 2008

JON W. DUDAS
*Director of the United States Patent and Trademark Office*